US010498414B1

(12) United States Patent
Onggosanusi et al.

(10) Patent No.: US 10,498,414 B1
(45) Date of Patent: *Dec. 3, 2019

(54) METHOD AND APPARATUS FOR CHANNEL STATE INFORMATION (CSI) REPORTING

(71) Applicant: Samsung Electronics Co., Ltd., Suwon-si, Gyeonggi-do (KR)

(72) Inventors: Eko Onggosanusi, Coppell, TX (US); Young-Han Nam, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/532,393

(22) Filed: Aug. 5, 2019

Related U.S. Application Data

(63) Continuation of application No. 15/966,235, filed on Apr. 30, 2018, now Pat. No. 10,374,672, which is a continuation of application No. 15/146,807, filed on May 4, 2016, now Pat. No. 9,967,012.

(60) Provisional application No. 62/157,828, filed on May 6, 2015, provisional application No. 62/203,172, filed on Aug. 10, 2015.

(51) Int. Cl.
*H04B 7/0456* (2017.01)
*H04B 7/06* (2006.01)
*H04W 88/02* (2009.01)
*H04W 28/18* (2009.01)

(52) U.S. Cl.
CPC ......... *H04B 7/0478* (2013.01); *H04B 7/0626* (2013.01); *H04B 7/0632* (2013.01); *H04B 7/063* (2013.01); *H04B 7/0639* (2013.01); *H04W 28/18* (2013.01); *H04W 88/02* (2013.01)

(58) Field of Classification Search
CPC .. H04B 7/0626; H04B 7/0469; H04B 7/0456; H04B 7/0478; H04B 7/0639; H04B 7/0417; H04B 7/06; H04B 7/0632; H04B 7/0413; H04B 7/0634; H04B 7/0452; H04W 24/10; H04W 72/0413; H04L 5/0057
USPC ....................................................... 375/267
See application file for complete search history.

(56) References Cited

U.S. PATENT DOCUMENTS

| 2014/0038623 | A1* | 2/2014 | Davydov | H04W 16/18 455/450 |
| 2017/0019159 | A1* | 1/2017 | Vook | H04B 7/0478 |

* cited by examiner

*Primary Examiner* — Leila Malek

(57) ABSTRACT

Methods and apparatuses for CSI reporting mechanisms are provided. A user equipment (UE) apparatus includes a transceiver and a processor. The transceiver is configured to receive configuration information for channel state information (CSI) reporting including a plurality of precoding codebook parameters. The processor is operably connected to the transceiver, and configured to determine, in response to receipt of the configuration information for the CSI reporting and the configuration information for the plurality of precoding codebook parameters, a first precoding matrix indicator (PMI) and a second PMI, wherein the first PMI includes one or two codebook indices. The transceiver is further configured to transmit the CSI reporting on an uplink channel, the CSI reporting including the determined first and second PMIs.

20 Claims, 10 Drawing Sheets

METHOD AND APPARATUS FOR CHANNEL STATE INFORMATION (CSI) REPORTING

CROSS-REFERENCE TO RELATED APPLICATIONS AND CLAIM OF PRIORITY

This application is a continuation of U.S. patent application Ser. No. 15/966,235, filed Apr. 30, 2018, which is a continuation of U.S. patent application Ser. No. 15/146,807, filed May 4, 2016, now U.S. Pat. No. 9,967,012, which claims priority under 35 U.S.C. § 119(e) to U.S. Provisional Patent Application No. 62/157,828 filed May 6, 2015; and U.S. Provisional Patent Application No. 62/203,172 filed Aug. 10, 2015, the disclosures of which are herein incorporated by reference in their entirety.

TECHNICAL FIELD

The present disclosure relates generally to transmission mode and channel state information (CSI) reporting for multiple transmit antennas which includes two dimensional arrays. Such two dimensional arrays can be associated with a type of multiple-input multiple-output (MIMO) system often termed "full-dimension" MIMO (FD-MIMO) or massive MIMO or 3D-MIMO.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for codebook design and signaling.

In one embodiment, a user equipment (UE) is provided. The UE includes a transceiver and a processor. The transceiver is configured to receive configuration information for a channel state information (CSI) reporting including a plurality of precoding codebook parameters. The processor is operably connected to the transceiver, and configured to determine, in response to receipt of the configuration information for the CSI reporting and the configuration information for the plurality of precoding codebook parameters, a first precoding matrix indicator (PMI) and a second PMI, wherein the first PMI includes one or two codebook indices. The transceiver is further configured to transmit the CSI reporting on an uplink channel, the CSI reporting including the determined first and second PMIs.

In another embodiment, a base station (BS) is provided. The BS includes a transceiver and a processor operably connected to the transceiver. The processor is configured to configure a UE with a CSI reporting; configure the UE with a plurality of precoding codebook parameters; cause the transceiver to transmit configuration information for the CSI reporting and precoding codebook parameters; and receive a CSI report from the UE including codebook indices from a first and a second PMIs.

In another embodiment, a method for operating a UE is provided. The method includes receiving, by the UE, configuration information for a CSI reporting including a plurality of precoding codebook parameters; in response to receipt of the configuration information for the CSI reporting and the configuration information for the plurality of precoding codebook parameters, determining, by the UE, a first precoding matrix indicator (PMI) and a second PMI, wherein the first PMI includes one or two codebook indices; and transmitting, by the UE, the CSI reporting on an uplink channel, the CSI reporting including the determined first and second PMIs.

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

List of Acronyms
2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); and 3GPP TS 36.331 version 12.4.0, "E-UTRA, Radio Resource Control (RRC) Protocol Specification" ("REF 4").

Figure 1:
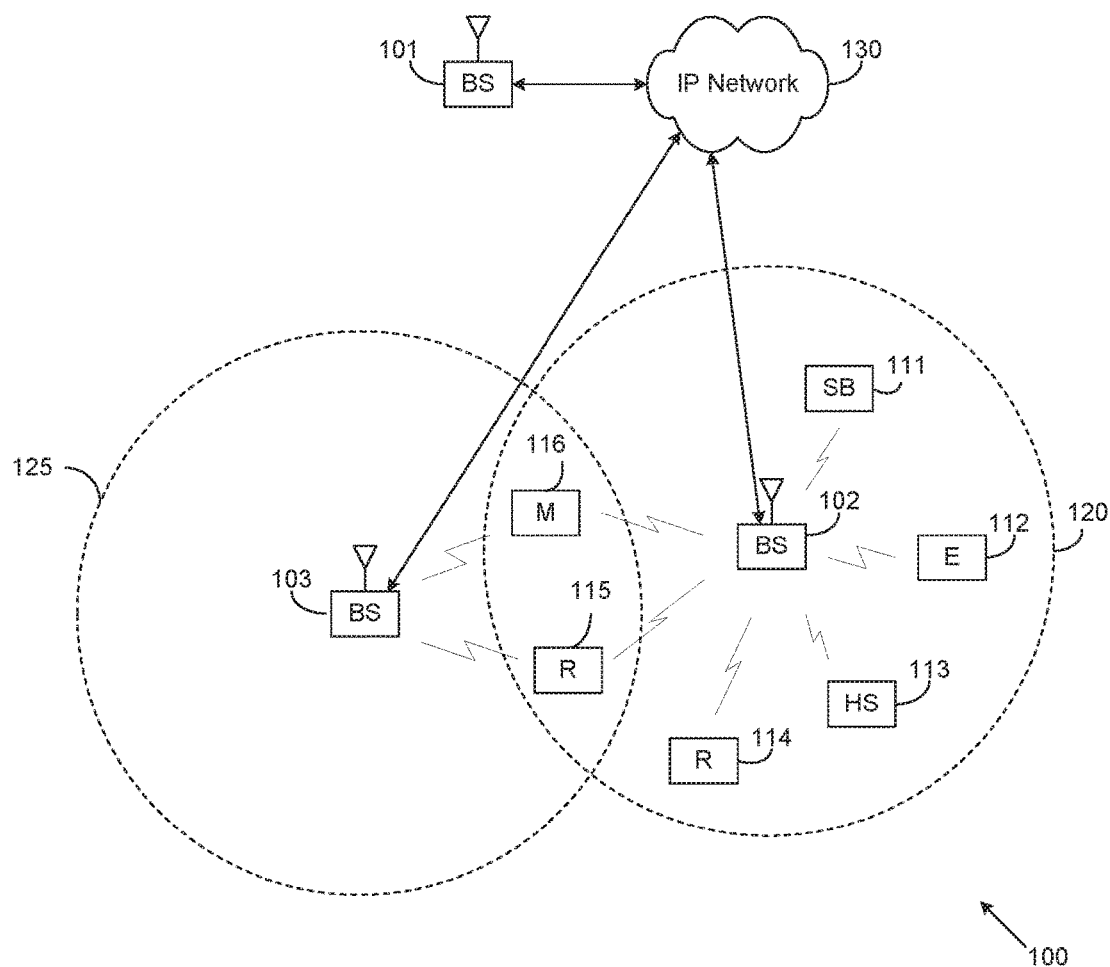
FIG. 1 illustrates an example wireless network according to various embodiments of the present disclosure.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure. The wireless network 100 includes an eNB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. Depending on the network type, other well-known terms can be used instead of "eNB" or "eNB," such as "base station" or "access point." For the sake of convenience, the terms "eNB" and "eNB" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which can be located in a small business (SB); a UE 112, which can be located in an enterprise (E); a UE 113, which may be located in a WiFi hotspot (HS); a UE 114, which can be located in a first residence (R); a UE 115, which may be located in a second residence (R); and a UE 116, which can be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, can have other shapes, including irregular shapes, depending upon the configuration of the eNBs and variations in the radio environment associated with natural and man-made obstructions.

As described in more detail below, one or more of BS 101, BS 102 and BS 103 include 2D antenna arrays as described in embodiments of the present disclosure. In some embodiments, one or more of BS 101, BS 102 and BS 103 support channel quality measurement and reporting for systems having 2D antenna arrays. In various embodiments, one or more of BS s 101-103 and UEs 111-116 perform signaling, configuration and/or calculation for CSI reporting.

Although FIG. 1 illustrates one example of a wireless network 100, various changes can be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
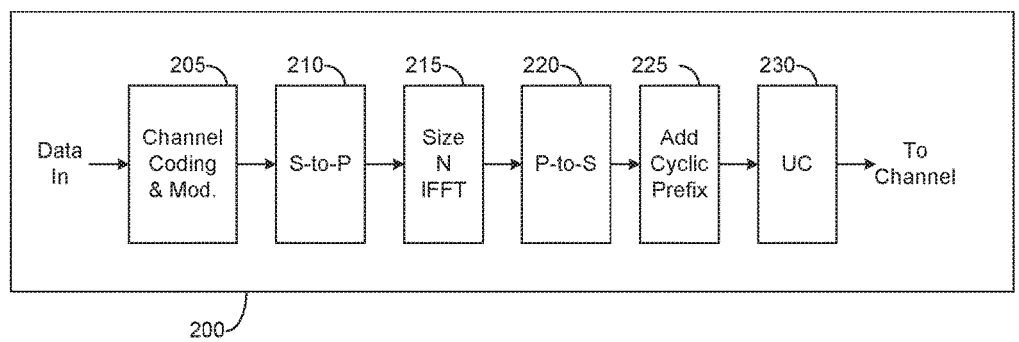
FIGS. 2A and 2B illustrate example wireless transmit and receive paths according to various embodiments of the present disclosure.
Figure 2B:
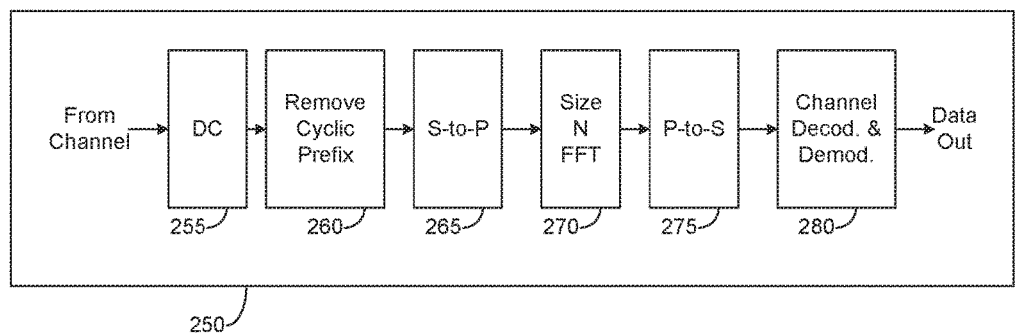

FIGS. 2A and 2B illustrate example wireless transmit and receive paths according to the present disclosure. In the following description, a transmit path 200 can be described as being implemented in an eNB (such as eNB 102), while a receive path 250 can be described as being implemented in a UE (such as UE 116). However, it will be understood that the receive path 250 could be implemented in an eNB and that the transmit path 200 could be implemented in a UE. In some embodiments, the receive path 250 is configured to support channel quality measurement and reporting for systems having 2D antenna arrays as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The up-converter 230 modulates (such as up-converts) the output of the 'add cyclic prefix' block 225 to an RF frequency for transmission via a wireless channel. The signal can also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for a designed codebook. Each of the eNBs 101-103 may implement a transmit path 200 that is analogous to transmitting in the downlink to UEs 111-116 and can implement a receive path 250 that is analogous to receiving in the uplink from UEs 111-116. Similarly, each of UEs 111-116 may implement a transmit path 200 for transmitting in the uplink to eNBs 101-103 and can implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
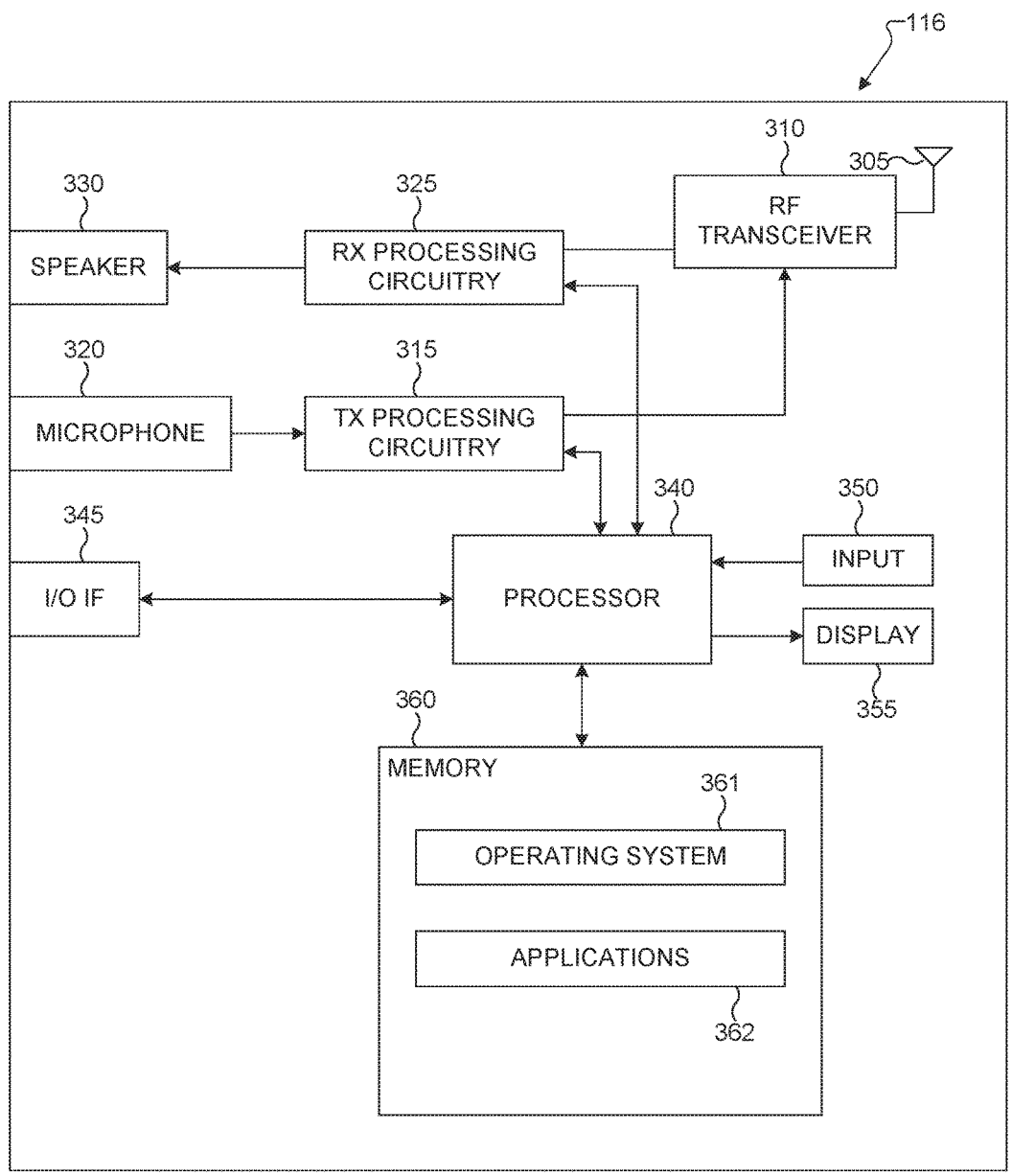
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface (IF) 345, an input 350, a display 355, and a memory 360. The memory 360 includes an operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for channel quality measurement and reporting for systems having 2D antenna arrays as described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from eNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
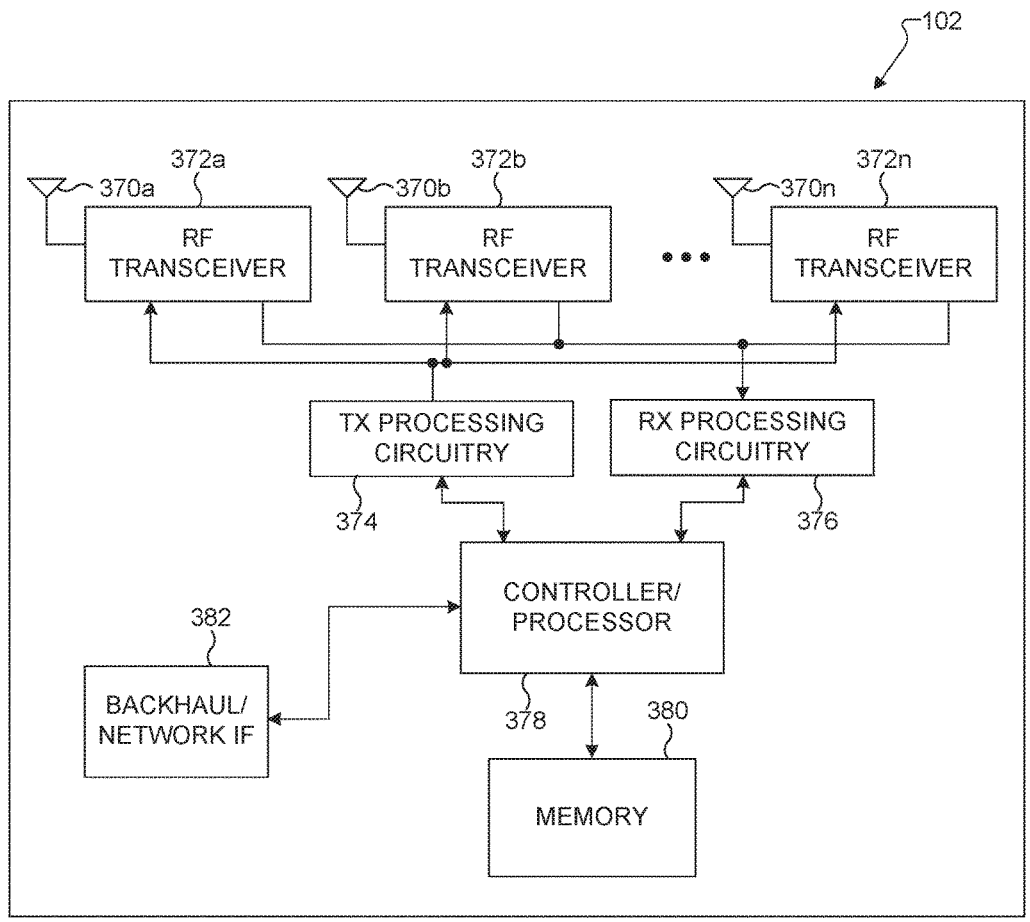
FIG. 3B illustrates an example enhanced NodeB (eNB) according to various embodiments of the present disclosure.

FIG. 3B illustrates an example eNB 102 according to the present disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of the present disclosure to any particular implementation of an eNB. eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G or new radio access technology or NR, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) perform configuration and signaling for CSI reporting.

Although FIG. 3B illustrates one example of an eNB 102, various changes can be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
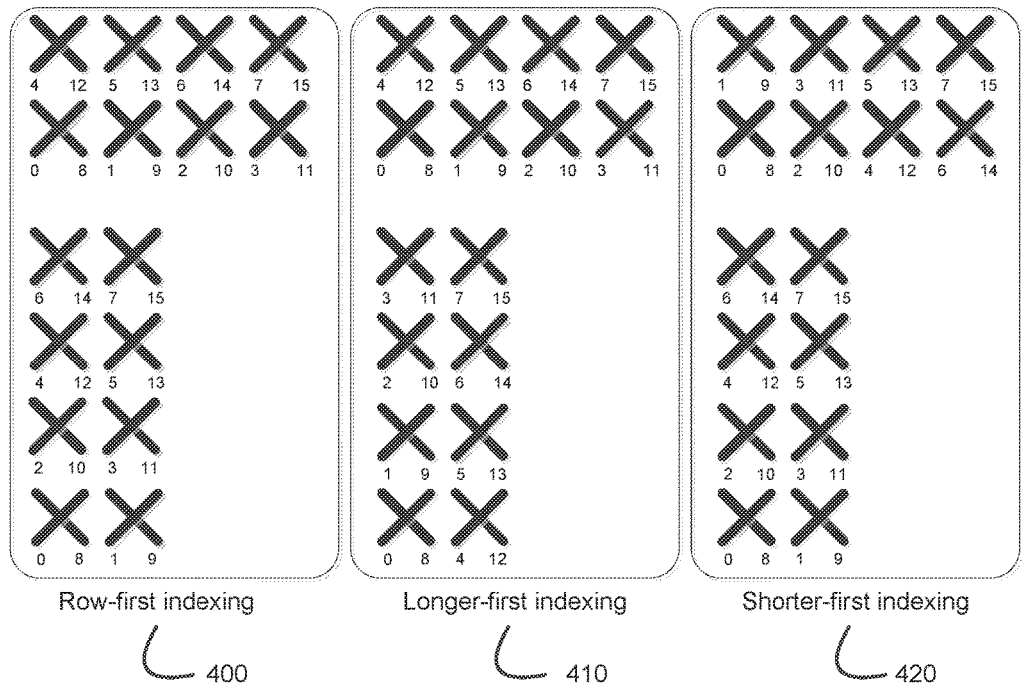
FIG. 4 illustrates example two-dimensional (2D) antenna arrays constructed from 16 dual-polarized elements arranged in a 4×2 or 2×4 rectangular format which can be utilized in various embodiments of the present disclosure.

FIG. 4 depicts an example of a 2D dual-polarized antenna port array with $M_a$ rows and $N_a$ columns where $(M_a, N_a)=(2,4)$ and $(4,2)$ which can be utilized in one or more embodiments of the present disclosure. These arrangement results in a total of $2M_aN_a=16$ ports, each mapped to one CSI-RS port. The three indexings 400, 410, and 420 are three examples in indexing the 16 antenna ports as a means of mapping antenna ports to precoding matrix elements. For row-first indexing 400, antenna ports associated with the same polarization group are indexed in a row-first manner regardless of $(M_a, N_a)$. For longer-first indexing 410, antenna ports associated with the same polarization group are indexed in a column-first manner when $M_a > N_a$, but row-first manner when $M_a < N_a$. For shorter-first indexing 420, antenna ports associated with the same polarization group are indexed in a row-first manner when $M_a > N_a$, but column-first manner when $M_a < N_a$. Indexing 400 is therefore termed row-first indexing while indexing 410 longer-first indexing and indexing 420 shorter-first indexing.

In these illustrative embodiments, both $M_a$ and $N_a$ can be configured by an eNB for a UE. In another example, rather than defining $M_a$ and $N_a$ as the number of rows and columns of the rectangular array of ports or port pattern, respectively, these two parameters can be defined as two-dimensional precoding codebook parameters. The values of $M_a$ and $N_a$ partly determine the manner in which a codebook (hence each precoding matrix element in the codebook) is mapped onto antenna ports of a one- or two-dimensional antenna array. This configuration can be performed with and without signaling the total number of antenna ports. When a UE is configured with a codebook, these parameters can be included either in a corresponding CSI process configuration or NZP (non-zero-power) CSI-RS resource configuration.

In legacy LTE systems, precoding codebooks are utilized for CSI reporting. Two categories of CSI reporting modes are supported: PUSCH-based aperiodic CSI (A-CSI) and PUCCH-based periodic CSI (P-CSI). In each category, different modes are defined based on frequency selectivity of CQI and/or PMI, that is, whether wideband (one CSI parameter calculated for all the "set S subbands") or subband (one CSI parameter calculated for each "set S subband") reporting is performed. The supported CSI reporting modes are given in TABLE 1 and 2.

TABLE 1

CQI and PMI Feedback Types for
PUSCH (Aperiodic) CSI Reporting Modes

| | | PMI Feedback Type | | |
| --- | --- | --- | --- | --- |
| | | No PMI | Single PMI | Multiple PMI |
| PUSCH CQI Feedback Type | Wideband (wideband CQI) | | | Mode 1-2 |
| | UE Selected (subband CQI) | Mode 2-0 | | Mode 2-2 |

TABLE 1-continued

CQI and PMI Feedback Types for
PUSCH (Aperiodic) CSI Reporting Modes

| | PMI Feedback Type | | |
|---|---|---|---|
| | No PMI | Single PMI | Multiple PMI |
| Higher Layer-configured (subband CQI) | Mode 3-0 | Mode 3-1 | Mode 3-2 |

TABLE 2

CQI and PMI Feedback Types for
PUCCH (Periodic) CSI Reporting Modes

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

Designing a CSI reporting mechanism which attains high accuracy with a reasonably low feedback overhead is challenging as more antenna ports are utilized. Especially relevant is an ability to adapt to long-term channel statistics including DL AoD profile. Unlike short-term channel coefficients, under certain circumstances it is possible to measure long-term channel statistics at an eNB even for FDD. Provided that UL-DL duplex distance is not too large, UL-DL long-term reciprocity holds and allows an eNB to measure DL AoD profile from uplink signals. If, for some reason, such a measurement scheme is infeasible, a low-rate CSI reporting which contains an indication of DL AoD profile can be employed. Therefore, there is a need to design codebooks for CSI reporting and its associated CSI reporting procedures, which slowly adapts to long-term channel statistics while maintaining low feedback overhead.

Furthermore, to support two-dimensional precoding, straightforward extensions such as configuring a CSI reporting mode for each of the two dimensions independently and applying the same CSI reporting mode along with its associated configurations for both dimensions are either inefficient (resulting in too many CSI reporting modes) or restrictive (neglecting potential differences between horizontal and vertical dimensions). Therefore, there is a need to extend the CSI reporting modes given in TABLE 1 and 2 in a manner which avoids the above two drawbacks. This entails refined definition of each of the CSI reporting modes as well as each of the CSI parameters. This also entails facilitating flexible support of PMI reporting granularity, that is, independent configurations for each of the two (for example, horizontal and vertical) dimensions.

A precoding matrix or a precoder, which can be used by an eNB (such as 102) to perform short-term precoding for transmitting to a UE and assumed by a UE to derive a CSI report, can be described as a dual-stage precoding matrix:

$$W = W_1 W_2 \quad \text{(Equation 1)}$$

Referring to FIG. 4, the size of the precoding matrix W is $N_{TX} \times N_L$ where $N_{TX} = 2M_a N_a$ is the total number of antenna or CSI-RS ports and $N_L$ is the number of transmission layers (also termed the rank). The first-stage precoder $W_1$ pertains to a long-term component and is associated with long-term channel statistics. In addition, $W_1$ is wideband (the same $W_1$ for all the set S subbands). The second-stage precoder $W_2$ pertains to a short-term component which performs selection, co-phasing, or any linear operation to $W_1$. Therefore, the number of columns of $W_1$ can be perceived as the number of basis vectors $N_b$ for $W_2$. In addition, $W_2$ can be either wideband (the same $W_2$ for all the set S subbands) or subband (one $W_2$ for each set S subband).

For 2D (two-dimensional) rectangular port array, each of the first and the second stage precoders can be described as a Kronecker product of a first and a second precoder. In the present disclosure, $A \otimes B$ denotes the Kronecker product between two matrices A and B. This example embodiment is termed the full Kronecker Product (full KP) codebook. The subscripts m and n in $W_{m,n}(i_{m,n})$ denote precoding stage (first or second) and dimension (first or second, such as vertical or horizontal), respectively. Each of the precoders $W_{m,n}$ is a function of an index which serves as a PMI component. Thus, the precoding matrix W can be described in terms of 4 PMI components $i_{1,1}, i_{1,2}, i_{2,1}, i_{2,2}$ as follows.

$$W(i_{1,1}, i_{1,2}, i_{2,1}, i_{2,2}) = \quad \text{(Equation 2)}$$
$$(W_{1,1}(i_{1,1}) W_{2,1}(i_{2,1})) \otimes (W_{1,2}(i_{1,2}) W_{2,2}(i_{2,2})) =$$
$$(W_{1,1}(i_{1,1}) \otimes W_{1,2}(i_{1,2}))(W_{2,1}(i_{2,1}) \otimes W_{2,2}(i_{2,2}))$$

Given a precoding codebook (a set of precoding matrices $W(i_{1,1}, i_{1,2}, i_{2,1}, i_{2,2})$), a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102. This PMI represents an index of a recommended precoding matrix in the precoding codebook. Different precoding codebooks can be used for different values of RI.

Another example embodiment assumes that a precoder in a designated codebook can be described in (3), termed the partial Kronecker Product (partial KP) codebook. The subscripts m and n in $W_{m,n}(i_{m,n})$ denote precoding stage (first or second stage) and dimension (first or second dimension), respectively. Each of the precoding matrices $W_{m,n}$ is a function of an index which serves as a PMI component. Thus, the precoding matrix W can be described as a function of 3 PMI components $i_{1,1}, i_{1,2}, i_2$ as follows.

$$W(i_{1,1}, i_{1,2}, i_2) = (W_{1,1}(i_{1,1}) \otimes W_{1,2}(i_{1,2}))(W_2(i_2)) \quad \text{(Equation 3)}$$

Similar to the previous codebook embodiment, a UE measures a CSI-RS in a subframe designated to carry CSI-RS, calculates a CSI (including PMI, RI, and CQI where each of these three CSI parameters can include multiple components) based on the measurement, and reports the calculated CSI to a serving eNB 102.

In either of the above two embodiments, the number of columns of $W_{1,1}$ and $W_{1,2}$ can be perceived as the number of basis vectors, or the number of spatial beams associated with a first and a second dimensions, $N_{b,1}$ and $N_{b,2}$ for the second-stage precoder(s). To adapt to changes in long-term channel statistics such as AoD profiles, these two parameters can be configurable for a UE. Changing the values of $N_{b,1}$ and $N_{b,2}$ amounts to reconfiguring the codebook for the UE. Configuring these parameters can also be done implicitly, such as by configuring a codebook selection parameter which corresponds to at least one of these two codebook parameters.

In the present disclosure, depending on the configured CSI-RS port pattern or the value of precoding codebook or codebook subset parameters received by a UE, the UE determines the manner in which CSI calculation and reporting is performed. This includes, for example, whether a 1D (one-dimensional) or a 2D (two-dimensional) CSI calculation and reporting is to be performed. As previously mentioned, such CSI-RS port pattern or precoding codebook parameters can include $M_a$ and/or $N_a$.

Although CSI-RS port pattern or codebook parameters are sufficient in determining the manner in which CSI calculation and reporting is performed, a new transmission mode (TM)—termed, for instance, TM x—which supports FD-MIMO and transmission with 2D antenna array can also be defined and used in conjunction with the CSI-RS port pattern or precoding parameters to determine the manner in which CSI calculation and reporting is performed.

For instance, if a UE is not configured for TM x, 1D CSI calculation and reporting according to legacy LTE (such as Rel.12) specification is performed. If a UE is configured for TM x, if it is inferred that $M_a=1$ or $N_a=1$ (either from a CSI-RS port pattern parameter or codebook or codebook subset parameters such as $M_a$ or $N_a$), 1D CSI reporting is performed (which can include 1D codebooks for PMI reporting in addition to those already supported in legacy Rel.12 LTE specification). Else, 2D CSI calculation and reporting is performed. When 1D CSI reporting is performed, the CSI reporting modes in TABLE 1 and 2 (hence the associated definition of CQI, PMI, and RI) are defined according to legacy Rel.12 LTE specification (see e.g., REF3 section 7.2). On the other hand, when 2D CSI reporting is performed, several extensions of the CSI reporting modes in TABLE 1 and 2 are given below.

If the Kronecker precoding structure defined in equation (2) is utilized (where $W_2$ can be described in terms of the Kronecker product of two precoders associated with two dimensions), then the following CSI reporting parameters are used. First, PMI/RI parameters $i_{2,V}$, $i_{1,V}$, v-RI for vertical dimension and $i_{2,H}$, $i_{1,H}$, h-RI for horizontal dimension. Alternatively, the four PMI values can be denoted as $\{i_{1,1}, i_{1,2}, i_{2,2}\}$. Here, $i_{m,n}$ denotes PMI associated with the m-th stage precoding (m=1, 2) and n-th dimension (note that the first dimension is not necessarily vertical). Second, CQI parameter. A single CQI entity (including one or two CQI values depending on the number of codewords) which is calculated conditioned on vertical and horizontal (or the first-dimension and the second-dimension) PMI/RI parameters.

If the Kronecker precoding structure defined in equation (3) is utilized (where $W_2$ is not described in terms of the Kronecker product of two precoders associated with two dimensions), then the following CSI reporting parameters are used. First, PMI/RI parameters $i_{1,V}$ for vertical dimension; $i_{1,H}$ for horizontal dimension; $i_2$ and RI associated with both dimensions. Alternatively, the three PMI values can be denoted as $\{i_{1,1}, i_{1,2}\}$. Here, $i_{1,n}$ denotes PMI associated with the first-stage precoding and n-th dimension (note that the first dimension is not necessarily vertical). Second, CQI parameter. A single CQI entity which is calculated conditioned upon vertical and horizontal (or the first-dimension and the second-dimension, respectively) PMI/RI parameters.

In both cases, coupling between RI and PMI, at least for each dimension, takes place since a codebook is associated with a given transmission rank hypothesis. A UE calculates a single CQI entity for both dimensions, in contrast to two separate CQI entities, to avoid CSI mismatch at a serving eNB. Therefore, two separate CSI reporting mode configurations, each for one dimension, are unnecessary and in fact result in performance loss.

Below are several exemplary embodiments, each corresponding to a distinct extension of the CSI reporting modes given in TABLE 1 and 2, where only one CSI reporting mode configuration is utilized for both horizontal and vertical (first and second) dimensions. In the following embodiments, only one CQI entity is calculated at a UE for both dimensions conditioned upon all the PMI/RI parameters. Each embodiment corresponds to a different PMI/RI construction for supporting 2D CSI-RS port pattern or 2D NZP CSI-RS resource or 2D codebook parameters.

In a first CSI reporting embodiment, a joint 2D (two-dimensional) PMI/RI is calculated and reported for 2D CSI-RS port pattern or codebook configuration. In this embodiment, one RI value associated with both dimensions and two sets of PMI are defined. The first PMI set includes the first-stage or first PMI $i_1$ which represents $\{i_{1,H}, i_{1,V}\}$ or $\{i_{1,1}, i_{1,2}\}$ encoded jointly. The second PMI set includes the second-stage or second PMI $i_2$ which either represents $\{i_{2,H}, i_{2,V}\}$ or $\{i_{2,1}, i_{2,2}\}$ encoded jointly for precoding structure in equation (2), or simply a single index $i_2$ for precoding structure in equation (3). In this solution, a same reporting granularity (in time and frequency) is applied to all the PMI parameters for both dimensions. Therefore, the same description for the different CSI reporting modes in REF3 section 7.2 directly applies.

The joint PMI parameters $i_2$ (if applicable) and $i_1$ can be defined with respect to one-dimensional PMIs. An example of such a definition for $i_1$ is given in TABLE 3 below. For illustrative purposes, the associated 1D codebook size is assumed to be 16. An analogous definition can be applied to $i_2$ if applicable (for instance, when precoder description in equation (2) is utilized). In the two exemplary tables of TABLE 3, a first dimension is associated with horizontal and a second dimension vertical (such as indexing 400 in FIG. 4). Other associations are possible. For example, if indexing 410 in FIG. 4 is assumed, the first dimension is associated with the shorter of the two dimensions. Else if indexing 420 in FIG. 4 is assumed, the first dimension is associated with the longer of the two dimensions. Else, any of these two dimensions is not associated with any particular dimension. In any of these examples, the tables below can be applied with the corresponding dimension association.

TABLE 3

Two exemplary definitions of joint 2D (a)

| $i_1$ for 2D CSI-RS port pattern or 2D codebook | $i_1$ for the first dimension ($i_{1,1}$) | $i_1$ for the second dimension ($i_{1,2}$) |
| --- | --- | --- |
| 0 | 0 | 0 |
| 1 | | 1 |
| ... | | ... |
| 15 | | 15 |
| 16 | 1 | 0 |
| 17 | | 1 |
| ... | | ... |
| 31 | | 15 |
| ... | ... | ... |
| 240 | 15 | 0 |
| 241 | | 1 |
| ... | | ... |
| 255 | | 15 |

TABLE 3-continued

Two exemplary definitions of joint 2D (b)

| $i_1$ for 2D CSI-RS port pattern or 2D codebook | $i_1$ for the second dimension ($i_{1,2}$) | $i_1$ for the first dimension ($i_{1,1}$) |
|---|---|---|
| 0 | 0 | 0 |
| 1 |  | 1 |
| ... |  | ... |
| 15 |  | 15 |
| 16 | 1 | 0 |
| 17 |  | 1 |
| ... |  | ... |
| 31 |  | 15 |
| ... | ... | ... |
| 240 | 15 | 0 |
| 241 |  | 1 |
| ... |  | ... |
| 255 |  | 15 |

In the example described in TABLE 3(a), the first PMI $i_1$ is constructed from concatenating the first PMI field $i_{1,1}$ and the second PMI field $i_{1,2}$. Since the first PMI is signaled as a binary-valued codeword formed by a sequence of bits, the first PMI codeword $i_1$ is constructed from $[i_{1,1}\ i_{1,2}]$. Written in terms of a bit sequence, this codeword can be described as $b_{1,0}, b_{1,1}, \ldots, b_{1,L_1-1}, b_{2,0}, b_{2,1}, \ldots, b_{2,L_2-1}$ where $b_{1,0}, b_{1,1}, \ldots, b_{1,L_1-1}$ is the bit sequence associated with or binary representation of $i_{1,1}$ (wherein $b_{1,0}$ is the most significant bit and $b_{1,L_1-1}$ the least significant bit of this bit sequence) and $b_{2,0}, b_{2,1}, \ldots, b_{2,L_2-1}$ is the bit sequence associated with or binary representation of $i_{1,2}$ (wherein $b_{2,0}$ is the most significant bit and $b_{2,L_2-1}$ the least significant bit of this bit sequence). Likewise, in the example described in TABLE 3(b), the first PMI $i_1$ is constructed from concatenating the second PMI field $i_{1,2}$ and the first PMI field $i_{1,1}$. Since the first PMI is signaled as a binary-valued codeword formed by a sequence of bits, the first PMI codeword $i_1$ is constructed from $[i_{1,2}\ i_{1,1}]$. Written in terms of a bit sequence, this codeword can be described as $b_{2,0}, b_{2,1}, \ldots, b_{2,L_2-1}, b_{1,0}, b_{1,1}, \ldots, b_{1,L_1-1}$ where $b_{1,0}, b_{1,1}, \ldots, b_{1,L_1-1}$ is the bit sequence associated with or binary representation of $i_{1,1}$ (wherein $b_{1,0}$ is the most significant bit and $b_{1,L_1-1}$ the least significant bit of this bit sequence) and $b_{2,0}, b_{2,1}, \ldots, b_{2,L_2-1}$ is the bit sequence associated with or binary representation of $i_{1,2}$ (wherein $b_{2,0}$ is the most significant bit and $b_{2,L_2-1}$ the least significant bit of this bit sequence).

This joint definition and encoding method for reporting the first PMI $i_1$ can be utilized for or in conjunction with any CSI calculation/reporting method pertaining to 2D CSI-RS port pattern or 2D precoding codebook where the first PMI $i_1$ includes two codebook indices associated with two dimensions. Therefore, it is also applicable to other CSI calculation/reporting embodiments in the present disclosure.

For PUSCH-based aperiodic CSI reporting, the frequency granularity of PMI reporting inherent in a given CSI reporting mode (either wideband PMI, UE-selected sub-band PMI, or eNB-configured sub-band PMI) applies to each of the 2D PMI parameter(s). Since A-CSI is reported by a UE upon a request from a serving eNB, time granularity is not an issue. For PUCCH-based periodic CSI reporting mode 1-1, only wideband PMI is reported. Therefore, frequency granularity is not an issue. Time granularity follows the relation between $i_1$ and $i_2$ for a given P-CSI reporting mode. For example, P-CSI mode 1-1 submode 1 allows $i_1$ and $i_2$ to be configured with different periodicities. For P-CSI mode 1-1 submode 2, the same periodicity applies to $i_1$ and $i_2$ since they are reported together.

Figure 5:
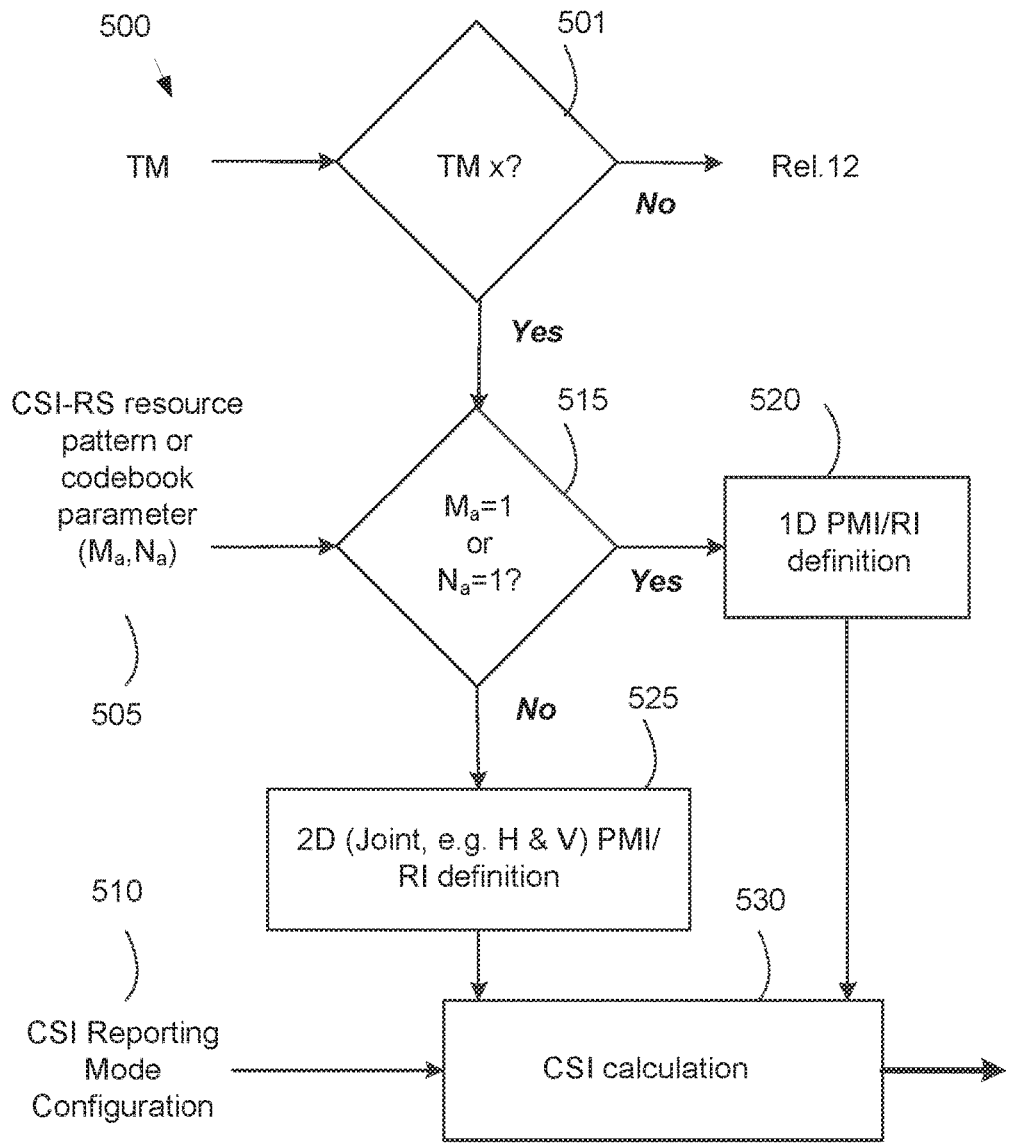
FIG. 5 illustrates an example CSI calculation procedure which responds to a CSI-RS resource pattern or codebook parameter and calculates a two-dimensional PMI/RI for two-dimensional pattern.

FIG. 5 illustrates an example CSI calculation procedure 500 which responds to a CSI-RS resource pattern or codebook parameter and calculates a two-dimensional PMI/RI for two-dimensional pattern. In this example, transmission mode configuration is used in conjunction with CSI-RS port pattern or codebook parameters $M_a$ and $N_a$. However, this example method can operate without transmission mode configuration. Upon receiving a transmission mode configuration 501 and a CSI-RS resource pattern configuration 505, a UE determines whether the pattern is 1D or 2D (515) if the UE is configured for a certain corresponding transmission mode. The criterion in embodiment 515 utilizes a CSI-RS port pattern or codebook parameters or codebook subset parameters such as $M_a$ or $N_a$. If it is associated with 1D configuration, a 1D PMI/RI definition such as the one given in section 7.2 of REF3 is used (530). Else, a 2D joint PMI/RI definition is used (520). In case of 2D configuration, this 2D joint PMI/RI corresponds to the horizontal (H) and vertical (V) dimensions—or a first and a second dimension—of the CSI-RS port pattern or codebook configuration. Having determined the dimensionality of PMI/RI, the UE calculates CSI in 525 given a CSI reporting mode configuration from a serving eNB (510).

While this CSI reporting mode extension is simple, it is restrictive since it imposes the same time and frequency granularity for PMI reporting in both dimensions. In some notable cases, horizontal and vertical array dimensions can experience different channel characteristics. The next embodiment partially addresses this issue.

In a second CSI reporting embodiment, the time and/or frequency granularity of PMI reporting for one of the dimensions is configurable for a UE. Since a single CQI entity is computed for dimensions, the CSI reporting modes given in TABLE 1 and 2 can be extended for 2D CSI-RS port pattern or codebook configuration via configuring time and/or frequency granularity of PMI reporting associated with one of the two dimensions. The choice of the two dimensions (whether the first or the second dimension) whose time and/or frequency granularity of PMI reporting is configurable can be configured via higher-layer or RRC signaling. Alternatively, this choice can be fixed. For example, it can be fixed to the second dimension.

This second embodiment allows some additional flexibility over the time and/or frequency granularity of PMI reporting associated with each of the CSI reporting modes. The granularity inherent in the configured CSI reporting mode is applied to the other dimension—in this example, the first dimension. Configurable frequency granularity (wideband PMI or sub-band PMI) is applicable only for PUSCH-based aperiodic CSI reporting (A-CSI) given in TABLE 1. Configurable time granularity (reporting periodicity) is applicable only for PUCCH-based periodic CSI reporting (P-CSI) given in TABLE 2. This configuration can be performed by a serving eNB and signaled to the UE via higher-layer (RRC) signaling. As an example, this configuration parameter can be termed PMI_TF_Granularity_2ndD_freq and PMI_TF_Granularity_2ndD_time.

Figure 6:
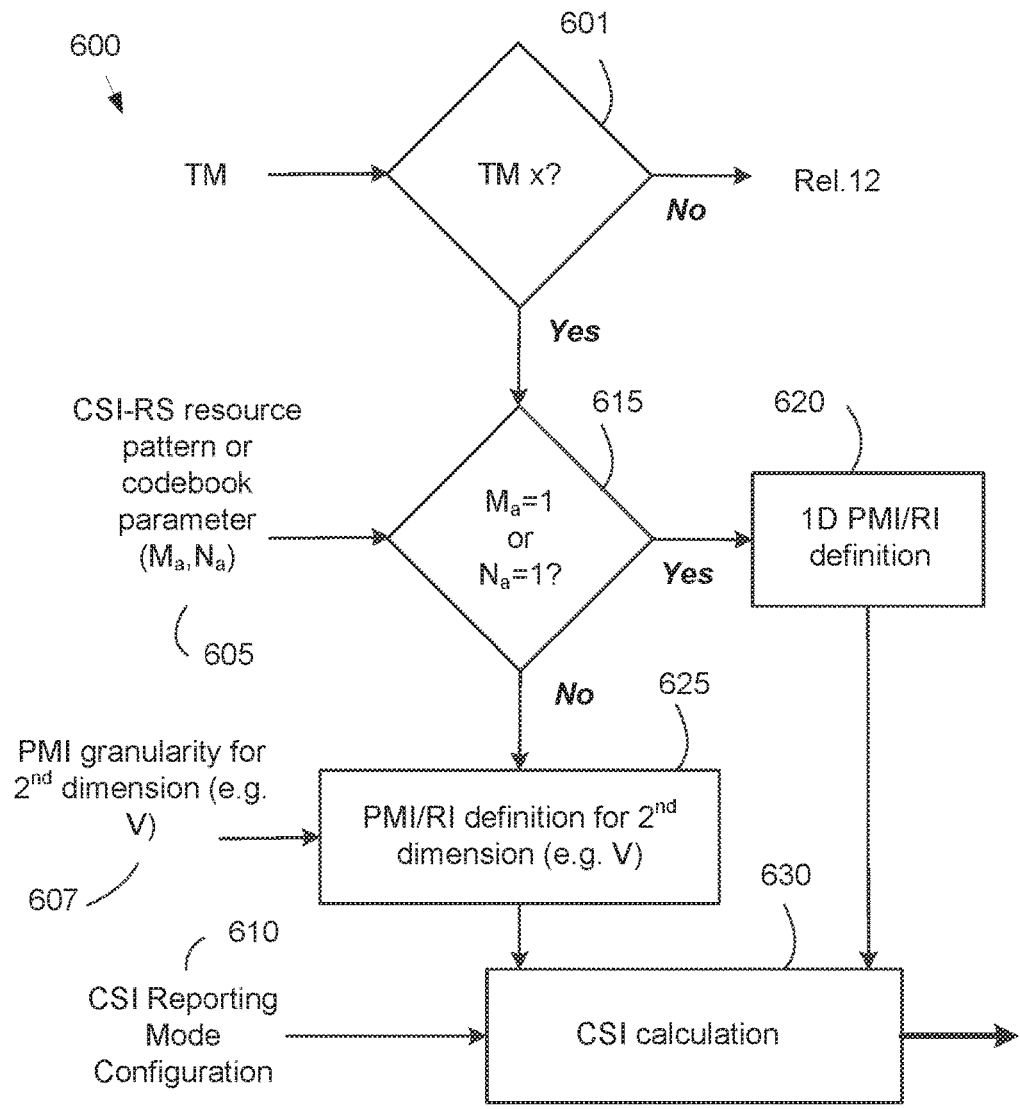
FIG. 6 illustrates an example CSI calculation procedure which responds to a CSI-RS resource pattern or codebook parameter and a PMI/RI configuration for a second dimension.

FIG. 6 illustrates an example CSI calculation procedure 600 which responds to a CSI-RS resource pattern or codebook parameters and a PMI/RI configuration for a second dimension. In this example, transmission mode configuration is used in conjunction with CSI-RS port pattern or codebook parameters $M_a$ and $N_a$. However, this example method can operate without transmission mode configuration. Upon receiving a transmission mode configuration 601 and a CSI-RS port pattern or codebook parameter configuration 605, the UE determines whether the pattern is 1D or 2D (615) if the UE is configured for a certain corresponding transmission mode. The criterion in the determination in 615 utilizes a CSI-RS port pattern or codebook parameters or codebook subset parameters such as $M_a$ or $N_a$. If it is associated with 1D configuration, a 1D PMI/RI definition such as the one given in section 7.2 of REF3 is used (620). Else, a 2D joint PMI/RI definition is used (625). In case of 2D CSI-RS port pattern, the UE receives and decodes the PMI granularity for a second dimension in 625 from a configuration parameter 607 (for instance, PMI_TF_Granularity_2ndD_freq and PMI_TF_Granularity_2ndD_time from higher-layer signaling). Having determined the dimensionality of PMI/RI, the UE calculates CSI in 630 given a CSI reporting mode configuration 610 from a serving eNB. The PMI granularity for a first dimension is inferred from the CSI reporting mode configuration 610.

An exemplary assignment for the first and second dimension is horizontal (H) and vertical (V), respectively. If indexing 410 is used, the first dimension is associated with the shorter of the two dimensions. Else, if indexing 420 is used, the first dimension is associated with the longer of the two dimensions. Else, any of these two dimensions is not associated with any particular dimension.

For dual-stage precoding structure in equation (2), the first-stage precoding matrix $W_1$ is a wideband precoder. Therefore, frequency granularity given in the RRC parameter PMI_TF_Granularity_2ndD_freq associated with a second dimension only applies to $W_2$ when a UE reports PUSCH-based aperiodic CSI. Then it is applicable when $W_2$ can be described as a Kronecker product between horizontal and vertical (or a first dimension and a second dimension) precoding matrices (such as the description in equation (2)). At least two alternatives can be used for PMI_TF_Granularity_2ndD_freq. A first alternative is a one-bit indicator for the second dimension which selects between wideband PMI (calculated assuming transmission on the set S subbands) and subband PMI (calculated assuming transmission on the given subband). A second alternative is a one-bit indicator for the second dimension which selects between the default PMI granularity given by the choice of A-CSI reporting mode and its alternative PMI granularity. For example, for A-CSI mode 3-2, if PMI_TF_Granularity_2ndD_freq is set to default (e.g. 0), the PMI associated with the second dimension is subband. Otherwise, if PMI_TF_Granularity_2ndD_freq is set to alternative (e.g. 1), the PMI associated with the second dimension is wideband.

In terms of time granularity, PMI_TF_Granularity_2ndD_time configures the time granularity of PUCCH-based periodic CSI reporting. For dual-stage precoding structure in equation (2), this applies to $W_1$ associated with a second dimension $W_{1,2}$. It also applies to for the second dimension of $W_2$ if $W_2$ can be described as a Kronecker product between horizontal and vertical precoding matrices (or a first dimension and a second dimension). For 2D CSI-RS port pattern, this applies, for example, when the horizontal and vertical components of $W_2$ can be separated as exemplified in the precoder structure in equation (2).

Some exemplary specifications for this embodiment are given below. Here ($M_a$, $N_a$) represent 2D CSI-RS port pattern or codebook parameters for a given NZP CSI-RS resource where $M_a$ and $N_a$ are associated with a first and a second dimension, respectively. Two RRC parameters PMI_TF_Granularity_2ndD_time and PMI_TF_Granularity_2ndD_freq configure the time and frequency granularity as described above. The second dimension is assumed to be vertical. These definitions are exemplary and illustrative. For example, the criterion in embodiment for determining between 1D and 2D utilizes a CSI-RS port pattern or codebook parameters or codebook subset parameters such as $M_a$ or $N_a$. In addition, if indexing 410 is used, the first dimension is associated with the shorter of the two dimensions. Else, if indexing 420 is used, the first dimension is associated with the longer of the two dimensions. In that case, $\{i_{1,V}, i_{1,H}, i_{2,V}, i_{2,H}\}$ can be replaced by $\{i_{1,1}, i_{1,2}, i_{2,1}, i_{2,2}\}$ or $\{i_{1,2}, i_{1,1}, i_{2,2}, i_{2,1}\}$. Furthermore, if precoding description in equation (3) is used instead of (2), $\{i_{2,V}, i_{2,H}\}$ is substituted with a single index $i_2$. Furthermore, $\{i_{1,V}, i_{1,H}, i_2\}$ is replaced by $\{i_{1,1}, i_{1,2}, i_2\}$ or $\{i_{1,2}, i_{1,1}, i_2\}$. Moreover, 'horizontal codebook' can be renamed 'a first codebook' and 'vertical codebook can be renamed 'a second codebook.' These definitions describe only the components applicable to the use of 2D CSI-RS port pattern or codebook.

For example, for PUSCH-based aperiodic CSI reporting (see e.g., TABLE 1), mode 1-2 can be described as follows:
For each subband a preferred first-dimension (for instance, horizontal) precoding matrix is selected from the first-dimension codebook subset assuming transmission only in the subband
  If $M_a>1$ and $N_a>1$ and PMI_TF_Granularity_2ndD_freq=WIDEBAND, a single preferred second-dimension (for instance, vertical) precoding matrix is selected from the second-dimension codebook subset assuming transmission on set S subbands.
  If $M_a>1$ and $N_a>1$ and PMI_TF_Granularity_2ndD_freq=SUBBAND, a preferred second-dimension precoding matrix is selected from the second-dimension codebook subset assuming transmission only in the subband.
A UE reports one wideband CQI value per codeword which is calculated assuming the use of the corresponding selected first-dimension and second-dimension precoding matrices.
A UE reports the following precoding matrix indicators:
  If $M_a=1$ or $N_a=1$, a first precoding matrix indicator for all set S subbands and a second precoding matrix indicator for each set S subband.
  If $M_a>1$ and $N_a>1$ and PMI_TF_Granularity_2ndD_freq=WIDEBAND, a first first-dimension and second-dimension precoding matrix indicator $i_{1,H}$ and $i_{1,V}$ for the set S subbands, a second first-dimension precoding matrix indicator $i_{2,H}$ for each set S subband, and a second second-dimension precoding matrix indicator $i_{2,V}$ for the set S subbands
  If $M_a>1$ and $N_a>1$ and PMI_TF_Granularity_2ndD_freq=SUBBAND, a first first-dimension and second-dimension precoding matrix indicator $i_{1,H}$ and $i_{1,V}$ for the set S subbands, a second first-dimension precoding matrix indicator $i_{2,H}$ for each set S subband, and a second second-dimension precoding matrix indicator $i_{2,V}$ for each set S subband
  If precoding structure in equation (3) is used instead of (2), $i_{2,H}$ and $i_{2,V}$ for each set S subband are replaced by $i_2$ for each set S subband
Subband size is given by Table 7.2.1-3 in REF3.
For transmission modes 4, 8, 9, 10, and x the reported PMI and CQI values are calculated conditioned on the reported RI. For other transmission modes they are reported conditioned on rank 1.

Mode 3-1 can be described as follows:

A single first-dimension (for instance, horizontal) precoding matrix is selected from the first-dimension codebook subset assuming transmission on set S subbands
- If $M_a>1$ and $N_a>1$ and PMI_TF_Granularity_2ndD_freq=WIDEBAND, a single preferred second-dimension (for instance, vertical) precoding matrix is selected from the second-dimension codebook subset assuming transmission on set S subbands.
- If $M_a>1$ and $N_a>1$ and PMI_TF_Granularity_2ndD_freq=SUBBAND, a preferred second-dimension precoding matrix is selected from the second-dimension codebook subset assuming transmission only in the subband.

A UE reports one subband CQI value per codeword for each set S subband which are calculated assuming the use of the corresponding selected first-dimension and second-dimension precoding matrices and assuming transmission in the corresponding subband.

A UE reports a wideband CQI value per codeword which is calculated assuming the use of the corresponding selected first-dimension and second-dimension precoding matrices A UE reports the following precoding matrix indicators:
- If $M_a=1$ or $N_a=1$, a first and second precoding matrix indicator corresponding to the selected single precoding matrix.
- If $M_a>1$ and $N_a>1$ and PMI_TF_Granularity_2ndD_freq=WIDEBAND, a first first-dimension and second-dimension precoding matrix indicator $i_{1,H}$ and $i_{1,V}$ for the set S subbands, a second first-dimension and second-dimension precoding matrix indicator $i_{2,H}$ and $i_{2,V}$ for the set S subbands
  - If precoding structure in equation (3) is used instead of (2), $i_{2,H}$ and $i_{2,V}$ for the set S subbands are replaced by $i_2$ for the set S subbands
- If $M_a>1$ and $N_a>1$ and PMI_TF_Granularity_2ndD_freq=SUBBAND, a first first-dimension and second-dimension precoding matrix indicator $i_{1,H}$ and $i_{1,V}$ for the set S subbands, a second first-dimension precoding matrix indicator $i_{2,H}$ for the set S subbands, and a second second-dimension precoding matrix indicator $i_{2,V}$ for each set S subband For transmission modes 4, 8, 9, 10, and x the reported PMI and CQI values are calculated conditioned on the reported RI. For other transmission modes they are reported conditioned on rank 1.

Mode 3-2 can be described as follows:

For each subband a preferred first-dimension (for instance, horizontal) precoding matrix is selected from the first-dimension codebook subset assuming transmission only in the subband
- If $M_a>1$ and $N_a>1$ and PMI_TF_Granularity_2ndD_freq=WIDEBAND, a single preferred second-dimension (for instance, vertical) precoding matrix is selected from the second-dimension codebook subset assuming transmission on set S subbands.
- If $M_a>1$ and $N_a>1$ and PMI_TF_Granularity_2ndD_freq=SUBBAND, a preferred second-dimension precoding matrix is selected from the second-dimension codebook subset assuming transmission only in the subband.

A UE reports a wideband CQI value per codeword which is calculated assuming the use of the corresponding selected first-dimension and second-dimension precoding matrices.

A UE reports the following precoding matrix indicators:
- If $M_a=1$ or $N_a=1$, a first precoding matrix indicator for all set S subbands and a second precoding matrix indicator for each set S subband.
- If $M_a>1$ and $N_a>1$ and PMI_TF_Granularity_2ndD_freq=WIDEBAND, a first first-dimension and second-dimension precoding matrix indicator $i_{1,H}$ and $i_{1,V}$ for the set S subbands, a second first-dimension precoding matrix indicator $i_{2,H}$ for each set S subband, and a second second-dimension precoding matrix indicator $i_{2,V}$ for the set S subbands
- If $M_a>1$ and $N_a>1$ and PMI_TF_Granularity_2ndD_freq=SUBBAND, a first first-dimension and second-dimension precoding matrix indicator $i_{1,H}$ and $i_{1,V}$ for the set S subbands, a second first-dimension precoding matrix indicator $i_{2,H}$ for each set S subband, and a second second-dimension precoding matrix indicator $i_{2,V}$ for each set S subband
  - If precoding structure in equation (3) is used instead of (2), $i_{2,H}$ and $i_{2,V}$ for each set S subband are replaced by $i_2$ for each set S subband A UE reports one subband CQI value per codeword for each set S subband which are calculated assuming the use of the corresponding selected first-dimension and second-dimension precoding matrices and assuming transmission in the corresponding subband.

For transmission modes 4, 8, 9, 10, and x the reported PMI and CQI values are calculated conditioned on the reported RI. For other transmission modes they are reported conditioned on rank 1.

Description for mode 2-2 is analogous to the above description for modes 2-1, 3-1, and 3-2 and one of ordinary skill in the art would be able to derive the full description for mode 2-2 based on the above description for modes 2-1, 3-1, and 3-2.

An alternative embodiment for PUSCH-based aperiodic CSI mode 3-1 can be made by constraining the vertical PMI (or a second dimension PMI) to be wideband. This is applicable when, for instance, vertical channel variability is less than that of horizontal. In this case, PMI_TF_Granularity_2ndD_freq is not used. Therefore, mode 3-1 can be described as follows:

A single first-dimension (for instance, horizontal) precoding matrix is selected from the first-dimension codebook subset assuming transmission on set S subbands
- If $M_a>1$ and $N_a>1$, a single preferred second-dimension (for instance, vertical) precoding matrix is selected from the second-dimension codebook subset assuming transmission on set S subbands.

A UE reports one subband CQI value per codeword for each set S subband which are calculated assuming the use of the corresponding selected first-dimension and second-dimension precoding matrices and assuming transmission in the corresponding subband.

A UE reports a wideband CQI value per codeword which is calculated assuming the use of the corresponding selected first-dimension and second-dimension precoding matrices A UE reports the following precoding matrix indicators:
  If $M_a=1$ or $N_a=1$, a first and second precoding matrix indicator corresponding to the selected single precoding matrix.
  If $M_a>1$ and $N_a>1$, a first first-dimension and second-dimension precoding matrix indicator $i_{1,H}$ and $i_{1,V}$ for the set S subbands, a second first-dimension and second-dimension precoding matrix indicator $i_{2,H}$ and $i_{2,V}$ for the set S subbands
    If precoding structure in equation (3) is used instead of (2), $i_{2,H}$ and $i_{2,V}$ for the set S subbands are replaced by $i_2$ for the set S subbands
  For transmission modes 4, 8, 9, 10, and x the reported PMI and CQI values are calculated conditioned on the reported RI. For other transmission modes they are reported conditioned on rank 1.

In a third CSI reporting embodiment, dual-stage precoding is applied only on one of the two dimensions. While such one dimension can be either horizontal or vertical, in some deployment scenarios, the horizontal dimension tends to exhibit more time variation. Therefore, single-stage precoding is applied on the vertical (in this example, second) dimension.

In this case, a feature to configure a UE not to report at least one particular PMI parameter can be introduced. For example, a single-stage precoding can be performed on vertical dimension by turning off the second stage precoder $W_{2,V}$ and setting v-RI (rank indicator associated with the vertical dimension) to 1. Thus, one-stage wideband vertical precoding is used. This precoder structure (assumed for CSI reporting) can be described as follows (assuming indexing 410 in FIG. 4). Here, horizontal is assumed to be the first dimension and vertical the second dimension.

$$W = (W_{1,H} \otimes w_{1,V})W_{2,H} = (W_{1,H}W_{2,H}) \otimes w_{1,V} = \quad \text{(Equation 4)}$$
$$(W_{1,H} \otimes w_{1,V})W_2 = (W_{1,H}W_2) \otimes w_{1,V}$$

In this embodiment, the RRC configuration mechanism of PMI_TF_Granularity_2ndD_freq is not applicable.

In terms of time granularity, PMI_TF_Granularity_2ndD_time is still applicable and configures the time granularity of PUCCH-based periodic CSI reporting. For dual-stage precoding matrix in (2), this applies to $W_1$ associated with a second dimension.

Figure 7:
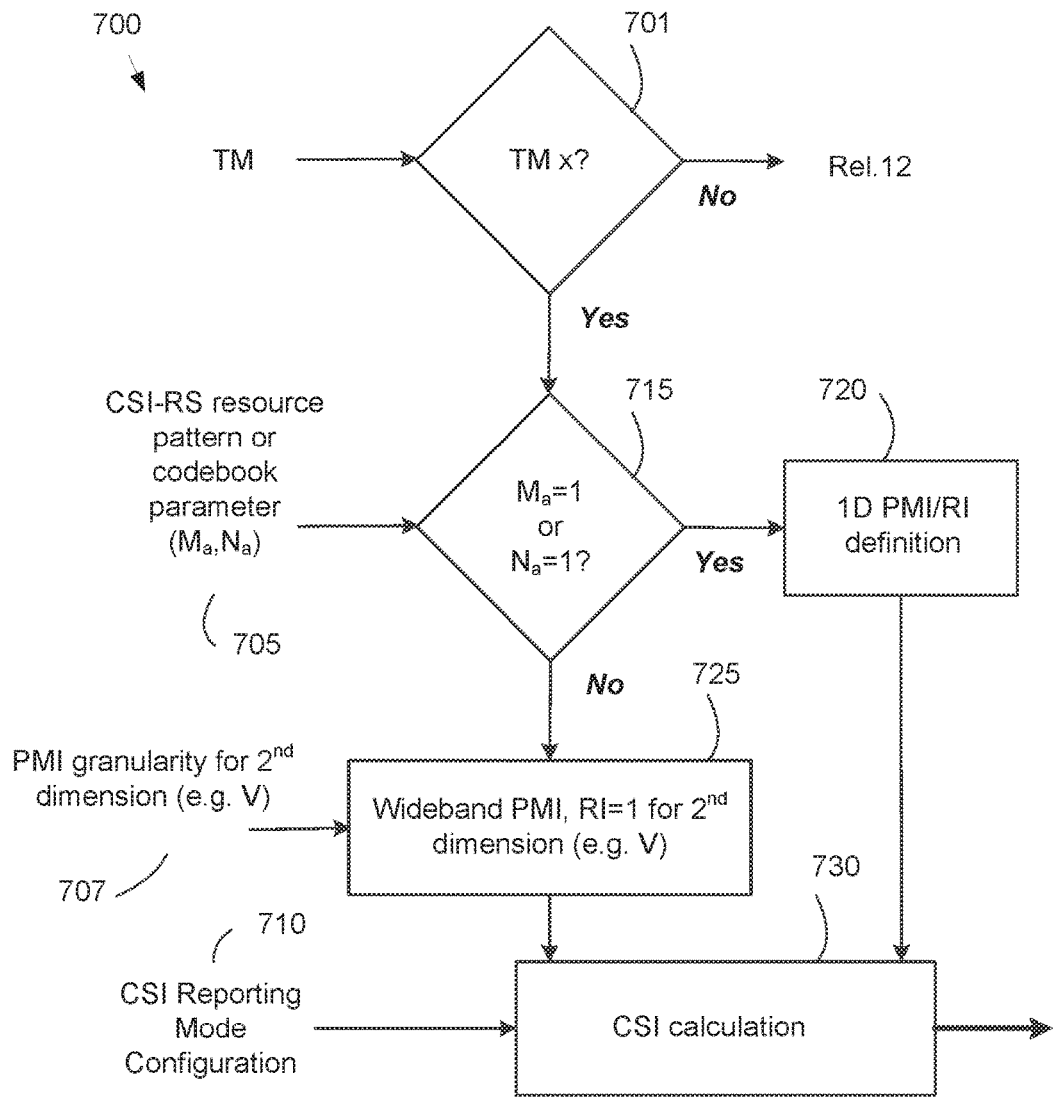
FIG. 7 illustrates an example CSI calculation procedure which responds to a CSI-RS resource pattern or codebook parameter and assumes a wideband PMI with RI=1 for a second dimension.

FIG. 7 illustrates an example CSI calculation procedure 700 which responds to a CSI-RS resource pattern or codebook parameter and assumes a wideband PMI with RI=1 for a second dimension. In this example, transmission mode configuration is used in conjunction with CSI-RS port pattern or codebook parameters $M_a$ and $N_a$. However, this example method can operate without transmission mode configuration. Upon receiving a transmission mode configuration 701 and a CSI-RS port pattern configuration or codebook parameters 705, the UE determines whether the pattern is associated with 1D or 2D (715) if the UE is configured for a certain corresponding transmission mode. The criterion in the determination in 715 utilizes a CSI-RS port pattern parameter or codebook parameters or codebook subset parameters such as $M_a$ or $N_a$. If it is associated with 1D pattern, a 1D PMI/RI definition such as the one given in section 7.2 of REF3 is used (720). Else, a 2D joint PMI/RI definition is used where a single-stage wideband precoding is applied for a second dimension as described above (725). Since the first-stage PMIs granularity is always wideband and the second-stage PMI for the second dimension is non-existent, the PMI granularity for the second dimension in 725 is always wideband. That is, when single-stage wideband precoding is the only option for the second dimension (in this example, vertical) precoding, PMI_TF_Granularity_2ndD_freq is not needed. Only PMI_TF_Granularity_2ndD_time applies to P-CSI reporting (707). Having determined the dimensionality of PMI/RI, the UE calculates CSI in 730 given a CSI reporting mode configuration 710 from a serving eNB. The PMI granularity for a first dimension is inferred from the CSI reporting mode configuration 710. An exemplary assignment for the first and second dimension is horizontal (H) and vertical (V), respectively.

Some exemplary specifications for this embodiment are given below. Here $(M_a, N_a)$ represent 2D CSI-RS port pattern or codebook parameters for a given NZP CSI-RS resource where $M_a$ and $N_a$ are associated with a first and a second dimension, respectively. One RRC parameters PMI_TF_Granularity_2ndD_time configures the time granularity as described above. The second dimension is assumed to be vertical. These definitions are exemplary and illustrative. For example, the criterion in embodiment for determining between 1D and 2D utilizes a CSI-RS port pattern or codebook parameters or codebook subset parameters such as $M_a$ or $N_a$. In addition, if indexing 410 is used, the first dimension is associated with the shorter of the two dimensions. Else, if indexing 420 is used, the first dimension is associated with the longer of the two dimensions. In that case, $\{i_{1,V}, i_{1,H}, i_{2,H}\}$ can be replaced by $\{i_{1,1}, i_{1,2}, i_{2,1}\}$ or $\{i_{1,2}, i_{1,1}, i_{2,2}\}$. Furthermore, if precoding description in equation (3) is used instead of (2), $\{i_{2,H}, i_{2,V}\}$ is substituted with a single index $i_2$. Furthermore, $\{i_{1,V}, i_{1,H}, i_2\}$ is replaced by $\{i_{1,1}, i_{1,2}, i_2\}$ or $\{i_{1,2}, i_{1,1}, i_2\}$. Moreover, 'horizontal codebook' can be renamed 'a first codebook' and 'vertical codebook' can be renamed 'a second codebook.' These definitions describe only the components applicable to the use of 2D CSI-RS port pattern or codebook.

For example, for PUSCH-based aperiodic CSI reporting (see e.g., TABLE 1), mode 1-2 can be described as follows:
  For each subband a preferred first-dimension (for instance, horizontal) precoding matrix is selected from the first-dimension codebook subset assuming transmission only in the subband
    If $M_a>1$ and $N_a>1$, a preferred second-dimension precoding matrix is selected from the second-dimension codebook subset assuming transmission only in the subband.
  A UE reports one wideband CQI value per codeword which is calculated assuming the use of the corresponding selected first-dimension and second-dimension precoding matrices.
  A UE reports the following precoding matrix indicators:
    If $M_a=1$ or $N_a=1$, a first precoding matrix indicator for all set S subbands and a second precoding matrix indicator for each set S subband.
    If $M_a>1$ and $N_a>1$, a first first-dimension and second-dimension precoding matrix indicator $i_{1,H}$ and $i_{1,V}$ for the set S subbands, a second first-dimension precoding matrix indicator $i_{2,H}$ (or $i_2$) for each set S subband
  Subband size is given by Table 7.2.1-3 of REF3.
  For transmission modes 4, 8, 9, 10, and x the reported PMI and CQI values are calculated conditioned on the reported RI. For other transmission modes they are reported conditioned on rank 1.

Mode 3-1 can be described as follows:
  A single first-dimension (for instance, horizontal) precoding matrix is selected from the first-dimension codebook subset assuming transmission on set S subbands
    If $M_a>1$ and $N_a>1$, a single preferred second-dimension (for instance, vertical) precoding matrix is selected from the rank-one second-dimension codebook subset assuming transmission on set S subbands.
  A UE reports one subband CQI value per codeword for each set S subband which are calculated assuming the use of the corresponding selected first-dimension and second-dimension precoding matrices and assuming transmission in the corresponding subband.
  A UE reports a wideband CQI value per codeword which is calculated assuming the use of the corresponding selected first-dimension and second-dimension precoding matrices
  A UE reports the following precoding matrix indicators:
    If $M_a=1$ or $N_a=1$, a first and second precoding matrix indicator corresponding to the selected single precoding matrix.
    If $M_a>1$ and $N_a>1$, a first first-dimension and second-dimension precoding matrix indicator $i_{1,H}$ and $i_{1,V}$ for the set S subbands, a second first-dimension $i_{2,H}$ (or $i_2$) for the set S subbands
  For transmission modes 4, 8, 9, 10, and x the reported PMI and CQI values are calculated conditioned on the reported RI. For other transmission modes they are reported conditioned on rank 1.

Mode 3-2 can be described as follows:
  For each subband a preferred first-dimension (for instance, horizontal) precoding matrix is selected from the first-dimension codebook subset assuming transmission only in the subband
    If $M_a>1$ and $N_a>1$, a preferred second-dimension precoding matrix is selected from the second-dimension codebook subset assuming transmission only in the subband.
  A UE reports a wideband CQI value per codeword which is calculated assuming the use of the corresponding selected first-dimension and second-dimension precoding matrices.
  A UE reports the following precoding matrix indicators:
    If $M_a=1$ or $N_a=1$, a first precoding matrix indicator for all set S subbands and a second precoding matrix indicator for each set S subband.
    If $M_a>1$ and $N_a>1$, a first first-dimension and second-dimension precoding matrix indicator $i_{1,H}$ and $i_{1,V}$ for the set S subbands, a second first-dimension precoding matrix indicator $i_{2,H}$ (or $i_2$) for each set S subband
  A UE reports one subband CQI value per codeword for each set S subband which are calculated assuming the use of the corresponding selected first-dimension and second-dimension precoding matrices and assuming transmission in the corresponding subband.
  For transmission modes 4, 8, 9, 10, and x the reported PMI and CQI values are calculated conditioned on the reported RI. For other transmission modes they are reported conditioned on rank 1.

Description for mode 2-2 is analogous to the above description for modes 2-1, 3-1, and 3-2 and one of ordinary skill in the art would be able to derive the full description for mode 2-2 based on the above description for modes 2-1, 3-1, and 3-2.

In a fourth CSI reporting embodiment, the CSI reporting modes in TABLE 1 and 2 are extended for supporting beamformed (BF) CSI-RS or 'CLASS B' or 'beamformed' eMIMO-Type with one NZP CSI-RS resource. Therefore, when a UE receives BF CSI-RS from a serving eNB or is configured with 'CLASS B' ('beamformed') eMIMO-Type, the UE can be configured to report PMI parameters associated with $W_2$ without $W_1$. In this case, CSI reporting is done similarly to single-stage precoding. For example, as the UE receives and decodes an RRC parameter which configures the UE for either beamformed CSI-RS reception (or 'CLASS B' ('beamformed') eMIMO-Type) or turning OFF any PMI reporting associated with $W_1$, the UE performs CSI reporting associated with single-stage precoding. In this case, RI/PMI definition, but only that which is associated with $W_2$, from either embodiment 1, 2, or 3 is applicable.

Exemplary descriptions which correspond to this embodiment are given below. The second dimension is assumed to be vertical. These definitions are exemplary and illustrative. It is assumed that the number of beamformed CSI-RS ports is already acquired by the UE. This number of ports determines the horizontal and/or vertical codebooks associated with $W_2$ (hence $i_{2,H}$ and $i_{2,V}$). Moreover, 'horizontal codebook' can be renamed 'a first codebook' and 'vertical codebook can be renamed 'a second codebook.' For PUSCH-based aperiodic CSI reporting (see e.g., TABLE 1), mode 1-2 can be described as follows:
  For each subband a preferred first-dimension (for instance, horizontal) precoding matrix is selected from the first-dimension codebook subset assuming transmission only in the subband
    If $M_a>1$ and $N_a>1$ and PMI_TF_Granularity_2ndD_freq=WIDEBAND, a single preferred second-dimension (for instance, vertical) precoding matrix is selected from the second-dimension codebook subset assuming transmission on set S subbands.
    If $M_a>1$ and $N_a>1$ and PMI_TF_Granularity_2ndD_freq=SUBBAND, a preferred second-dimension precoding matrix is selected from the second-dimension codebook subset assuming transmission only in the subband.
  A UE reports one wideband CQI value per codeword which is calculated assuming the use of the corresponding selected first-dimension and second-dimension precoding matrices.
  A UE reports the following precoding matrix indicators:
    If $M_a=1$ or $N_a=1$, a second precoding matrix indicator for each set S subband.
    If $M_a>1$ and $N_a>1$ and PMI_TF_Granularity_2ndD_freq=WIDEBAND, a second first-dimension precoding matrix indicator $i_{2,H}$ for each set S subband, and a second second-dimension precoding matrix indicator $i_{2,V}$ for the set S subbands
    If $M_a>1$ and $N_a>1$ and PMI_TF_Granularity_2ndD_freq=SUBBAND, a second first-dimension precoding matrix indicator $i_{2,H}$ for each set S subband, and a second second-dimension precoding matrix indicator $i_{2,V}$ for each set S subband
  Subband size is given by Table 7.2.1-3 of REF3.
  For transmission modes 4, 8, 9, 10, and x the reported PMI and CQI values are calculated conditioned on the reported RI. For other transmission modes they are reported conditioned on rank 1.

Mode 3-1 can be described as follows:
  A single first-dimension (for instance, horizontal) precoding matrix is selected from the first-dimension codebook subset assuming transmission on set S subbands
    If $M_a>1$ and $N_a>1$ and PMI_TF_Granularity_2ndD_freq=WIDEBAND, a single preferred second-dimension (for instance, vertical) precoding matrix is selected from the second-dimension codebook subset assuming transmission on set S subbands.
    If $M_a>1$ and $N_a>1$ and PMI_TF_Granularity_2ndD_freq=SUBBAND, a preferred second-dimension precoding matrix is selected from the second-dimension codebook subset assuming transmission only in the subband.
  A UE reports one subband CQI value per codeword for each set S subband which are calculated assuming the use of the corresponding selected first-dimension and second-dimension precoding matrices and assuming transmission in the corresponding subband.
  A UE reports a wideband CQI value per codeword which is calculated assuming the use of the corresponding selected first-dimension and second-dimension precoding matrices
  A UE reports the following precoding matrix indicators:
    If $M_a=1$ or $N_a=1$, a second precoding matrix indicator corresponding to the selected single precoding matrix.
    If $M_a>1$ and $N_a>1$ and PMI_TF_Granularity_2ndD_freq=WIDEBAND, a second first-dimension and second-dimension precoding matrix indicator $i_{2,H}$ and $i_{2,V}$ for the set S subbands
    If $M_a>1$ and $N_a>1$ and PMI_TF_Granularity_2ndD_freq=SUBBAND, a second first-dimension precoding matrix indicator $i_{2,H}$ for the set S subbands, and a second second-dimension precoding matrix indicator $i_{2,V}$ for each set S subband
  For transmission modes 4, 8, 9, 10, and x the reported PMI and CQI values are calculated conditioned on the reported RI. For other transmission modes they are reported conditioned on rank 1.
Mode 3-2 can be described as follows:
  For each subband a preferred first-dimension (for instance, horizontal) precoding matrix is selected from the first-dimension codebook subset assuming transmission only in the subband
    If $M_a>1$ and $N_a>1$ and PMI_TF_Granularity_2ndD_freq=WIDEBAND, a single preferred second-dimension (for instance, vertical) precoding matrix is selected from the second-dimension codebook subset assuming transmission on set S subbands.
    If $M_a>1$ and $N_a>1$ and PMI_TF_Granularity_2ndD_freq=SUBBAND, a preferred second-dimension precoding matrix is selected from the second-dimension codebook subset assuming transmission only in the subband.
  A UE reports a wideband CQI value per codeword which is calculated assuming the use of the corresponding selected first-dimension and second-dimension precoding matrices.
  A UE reports the following precoding matrix indicators:
    If $M_a=1$ or $N_a=1$, a first precoding matrix indicator for all set S subbands and a second precoding matrix indicator for each set S subband.
    If $M_a>1$ and $N_a>1$ and PMI_TF_Granularity_2ndD_freq=WIDEBAND, a second first-dimension precoding matrix indicator $i_{2,H}$ for each set S subband, and a second second-dimension precoding matrix indicator $i_{2,H}$ for the set S subbands
    If $M_a>1$ and $N_a>1$ and PMI_TF_Granularity_2ndD_freq=SUBBAND, a second first-dimension precoding matrix indicator $i_{2,H}$ for each set S subband, and a second second-dimension precoding matrix indicator $i_{2,V}$ for each set S subband
  A UE reports one subband CQI value per codeword for each set S subband which are calculated assuming the use of the corresponding selected first-dimension and second-dimension precoding matrices and assuming transmission in the corresponding subband.
  For transmission modes 4, 8, 9, 10, and x the reported PMI and CQI values are calculated conditioned on the reported RI. For other transmission modes they are reported conditioned on rank 1.

Description for mode 2-2 is analogous to the above description for modes 2-1, 3-1, and one of ordinary skill in the art would be able to derive the full description for mode 2-2 based on the above description for modes 2-1, 3-1, and 3-2.

An alternative embodiment for PUSCH-based aperiodic CSI mode 3-1 can be made by constraining the vertical PMI (or, the PMI associated with one of the two dimensions) to be wideband. This is applicable when vertical channel variability is less than that of horizontal. In this case, PMI_TF_Granularity_2ndD_freq is not used. In this case, mode 3-1 can be described as follows:
  A single first-dimension (for instance, horizontal) precoding matrix is selected from the first-dimension codebook subset assuming transmission on set S subbands
    If $M_a>1$ and $N_a>1$, a single preferred second-dimension (for instance, vertical) precoding matrix is selected from the second-dimension codebook subset assuming transmission on set S subbands.
  A UE reports one subband CQI value per codeword for each set S subband which are calculated assuming the use of the corresponding selected first-dimension and second-dimension precoding matrices and assuming transmission in the corresponding subband.
  A UE reports a wideband CQI value per codeword which is calculated assuming the use of the corresponding selected first-dimension and second-dimension precoding matrices
  A UE reports the following precoding matrix indicators:
    If $M_a=1$ or $N_a=1$, a second precoding matrix indicator corresponding to the selected single precoding matrix.
    If $M_a>1$ and $N_a>1$, a second first-dimension and second-dimension precoding matrix indicator $i_{2,H}$ and $i_{2,V}$ for the set S subbands
  For transmission modes 4, 8, 9, 10, and x the reported PMI and CQI values are calculated conditioned on the reported RI. For other transmission modes they are reported conditioned on rank 1.

Furthermore, if precoder structure in equation (3) is used instead of (2), $\{i_{2,V}, i_{2,H}\}$ can be replaced by $\{i_2\}$. In this case, there is no need for a criterion to differentiate between 1D and 2D. Moreover, only a single precoding codebook is used. For PUSCH-based aperiodic CSI reporting (see e.g., TABLE 1), mode 1-2 can be described as follows:

For each subband a preferred precoding matrix is selected from the codebook subset assuming transmission only in the subband
   If PMI_TF_Granularity_2ndD_freq=WIDEBAND, a single preferred precoding matrix is selected from the codebook subset assuming transmission on set S subbands.
   If PMI_TF_Granularity_2ndD_freq=SUBBAND, a preferred precoding matrix is selected from the codebook subset assuming transmission only in the subband.
A UE reports one wideband CQI value per codeword which is calculated assuming the use of the corresponding selected precoding matrix.
A UE reports the following precoding matrix indicators:
   If PMI_TF_Granularity_2ndD_freq=WIDEBAND, a second precoding matrix indicator $i_2$ for each set S subband
   If PMI_TF_Granularity_2ndD_freq=SUBBAND, a second precoding matrix indicator $i_2$ for each set S subband
Subband size is given by Table 7.2.1-3 of REF3.
For transmission modes 4, 8, 9, 10, and x the reported PMI and CQI values are calculated conditioned on the reported RI. For other transmission modes they are reported conditioned on rank 1.

Mode 3-1 can be described as follows:
   A single precoding matrix is selected from the codebook subset assuming transmission on set S subbands
      If PMI_TF_Granularity_2ndD_freq=WIDEBAND, a single preferred precoding matrix is selected from the codebook subset assuming transmission on set S subbands.
      If PMI_TF_Granularity_2ndD_freq=SUBBAND, a preferred precoding matrix is selected from the codebook subset assuming transmission only in the subband.
   A UE reports one subband CQI value per codeword for each set S subband which are calculated assuming the use of the corresponding selected precoding matrix and assuming transmission in the corresponding subband.
   A UE reports a wideband CQI value per codeword which is calculated assuming the use of the corresponding selected precoding matrix
   A UE reports the following precoding matrix indicators:
      If PMI_TF_Granularity_2ndD_freq=WIDEBAND, a second precoding matrix indicator $i_2$ for each set S subband
      If PMI_TF_Granularity_2ndD_freq=SUBBAND, a second precoding matrix indicator $i_2$ for each set S subband
   For transmission modes 4, 8, 9, 10, and x the reported PMI and CQI values are calculated conditioned on the reported RI. For other transmission modes they are reported conditioned on rank 1.

Mode 3-2 can be described as follows:
   For each subband a preferred precoding matrix is selected from the codebook subset assuming transmission only in the subband
      If PMI_TF_Granularity_2ndD_freq=WIDEBAND, a single preferred precoding matrix is selected from the codebook subset assuming transmission on set S subbands.
      If PMI_TF_Granularity_2ndD_freq=SUBBAND, a preferred precoding matrix is selected from the codebook subset assuming transmission only in the subband.
   A UE reports a wideband CQI value per codeword which is calculated assuming the use of the corresponding selected precoding matrix.
   A UE report the following precoding matrix indicators:
      If PMI_TF_Granularity_2ndD_freq=WIDEBAND, a second precoding matrix indicator $i_2$ for each set S subband
      If PMI_TF_Granularity_2ndD_freq=SUBBAND, a second precoding matrix indicator $i_2$ for each set S subband
   A UE report one subband CQI value per codeword for each set S subband which are calculated assuming the use of the corresponding selected precoding matrix and assuming transmission in the corresponding subband.
   For transmission modes 4, 8, 9, 10, and x the reported PMI and CQI values are calculated conditioned on the reported RI. For other transmission modes they are reported conditioned on rank 1.

Description for mode 2-2 is analogous to the above description for modes 2-1, 3-1, and 3-2 and one of ordinary skill in the art would be able to derive the full description for mode 2-2 based on the above description for modes 2-1, 3-1, and 3-2.

In a fifth embodiment, departing from TABLE 1 and 2, CSI calculation and reporting for a given UE is fully configured and characterized with time and/or frequency granularity parameters. Time granularity configuration can include reporting periodicity/interval. Frequency granularity configuration can include a two-value indicator used to configure a UE with either WIDEBAND or SUBBAND reporting. Alternatively, frequency granularity configuration can include subband size (for example, in terms of the number of RBs) wherein one possible value indicates wideband reporting (one report for all the RBs).

In one alternative of this embodiment, the time/frequency granularity of CQI and PMI can be configured separately via higher-layer (RRC) signaling. For example, four RRC parameters CQI_T_Granularity, CQI_F_Granularity, PMI_T_Granularity, and PMI_F_Granularity can be used to configure CSI calculation/reporting for a UE. As mentioned before, time granularity does not apply to A-CSI. Therefore, only CQI_F_Granularity and PMI_F_Granularity apply. If P-CSI is associated with wideband-only reporting, frequency granularity does not apply to P-CSI. Therefore, only CQI_T_Granularity and PMI_T_Granularity apply.

In another alternative of this embodiment, the time/frequency granularity of CQI and PMI is configured jointly via higher-layer (RRC) signaling. For example, two RRC parameters CQIPMI_T_Granularity and CQIPMI_F_Granularity can be used to configure CSI calculation/reporting for a UE. As mentioned before, time granularity does not apply to A-CSI. Therefore, only CQIPMI_F_Granularity applies. If P-CSI is associated with wideband-only reporting, frequency granularity does not apply to P-CSI. Therefore, only CQIPMI_T_Granularity applies.

In addition to the above, different PMI reporting granularities can be introduced for two different dimensions when 2D CSI-RS port pattern or 2D precoding codebook structure is used. For the first alternative, the RRC parameter PMI_T_Granularity can be substituted with PMI_T_Granularity_1stD and PMI_T_Granularity_2ndD whereas the RRC parameter PMI_F_Granularity can be substituted with PMI_F_Granularity_1stD and PMI_F_Granularity_2ndD. For dual-stage precoder/codebook, different PMI reporting frequency granularities for different dimensions applies for the structure in equation (2), but not for the structure in equation (3).

Figure 8:
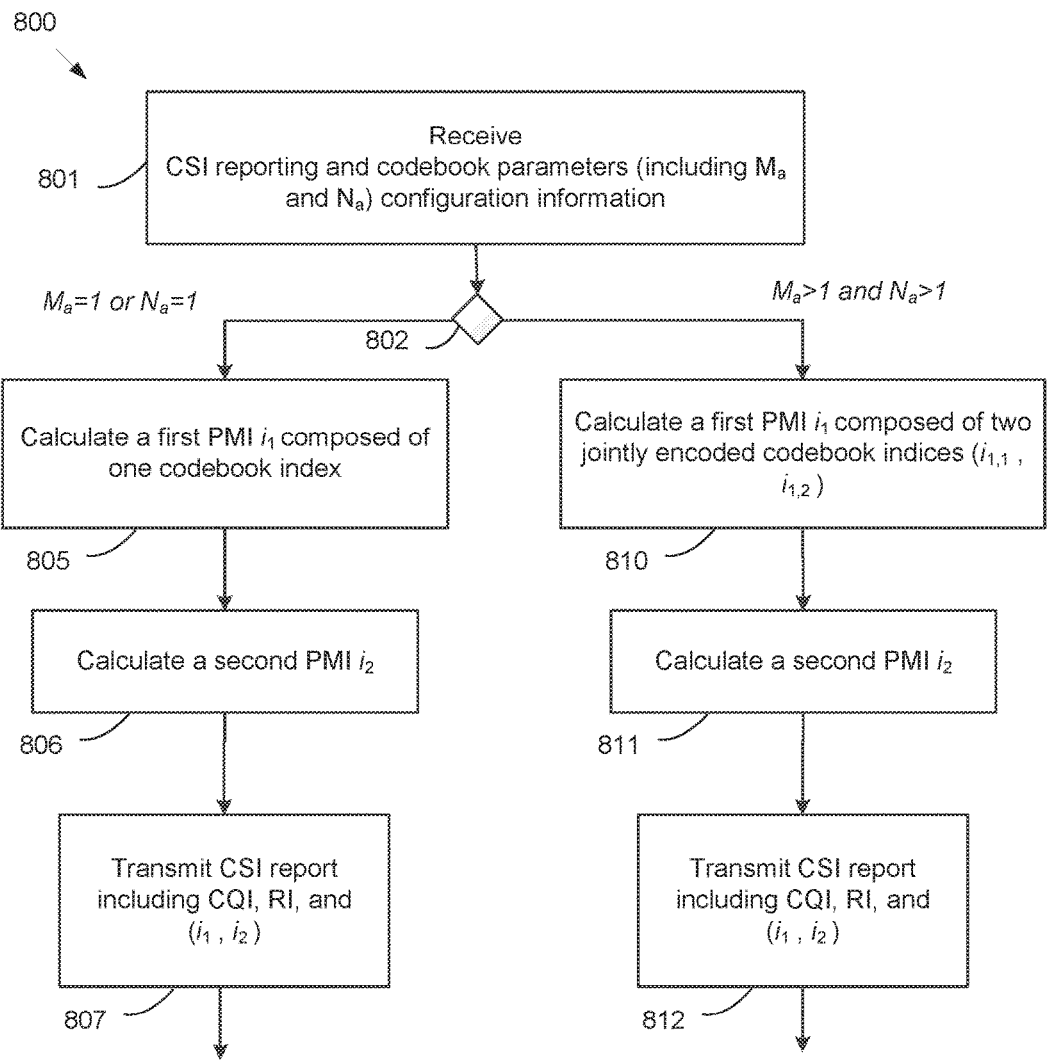
FIG. 8 illustrates an example method wherein a UE receives configuration information containing at least a CSI reporting configuration and codebook parameters and reports a first PMI composed of either one or two codebook indices conditioned on at least two codebook parameters.

FIG. 8 illustrates an example method 800 wherein a UE receives configuration information containing at least a CSI reporting configuration and codebook parameters (801). The CSI reporting configuration can include a choice of CSI reporting mode. Two of the codebook parameters are $M_a$ and $N_a$ which can correspond to the number of rows and columns in a two-dimensional dual-polarized port array with a total of $2M_a$, $N_a$ ports. In response to at least the codebook parameters $M_a$ and $N_a$ (802), the UE calculates a first PMI $i_1$. If at least one of $M_a$ and $N_a$ equals to 1, $i_1$ includes one codebook index associated with a first-stage precoding (805). If each of $M_a$ and $N_a$ equals to a value greater than 1, $i_1$ includes two codebook indices associated with a first-dimension $i_{1,1}$ and a second-dimension $i_{1,2}$ of the first-stage precoding, respectively (810). In either case, the UE calculates a second PMI $i_2$ (806 and 811) and transmits a CSI report including at least CQI, RI, and $\{i_1, i_2\}$ (807 and 812).

Figure 9:
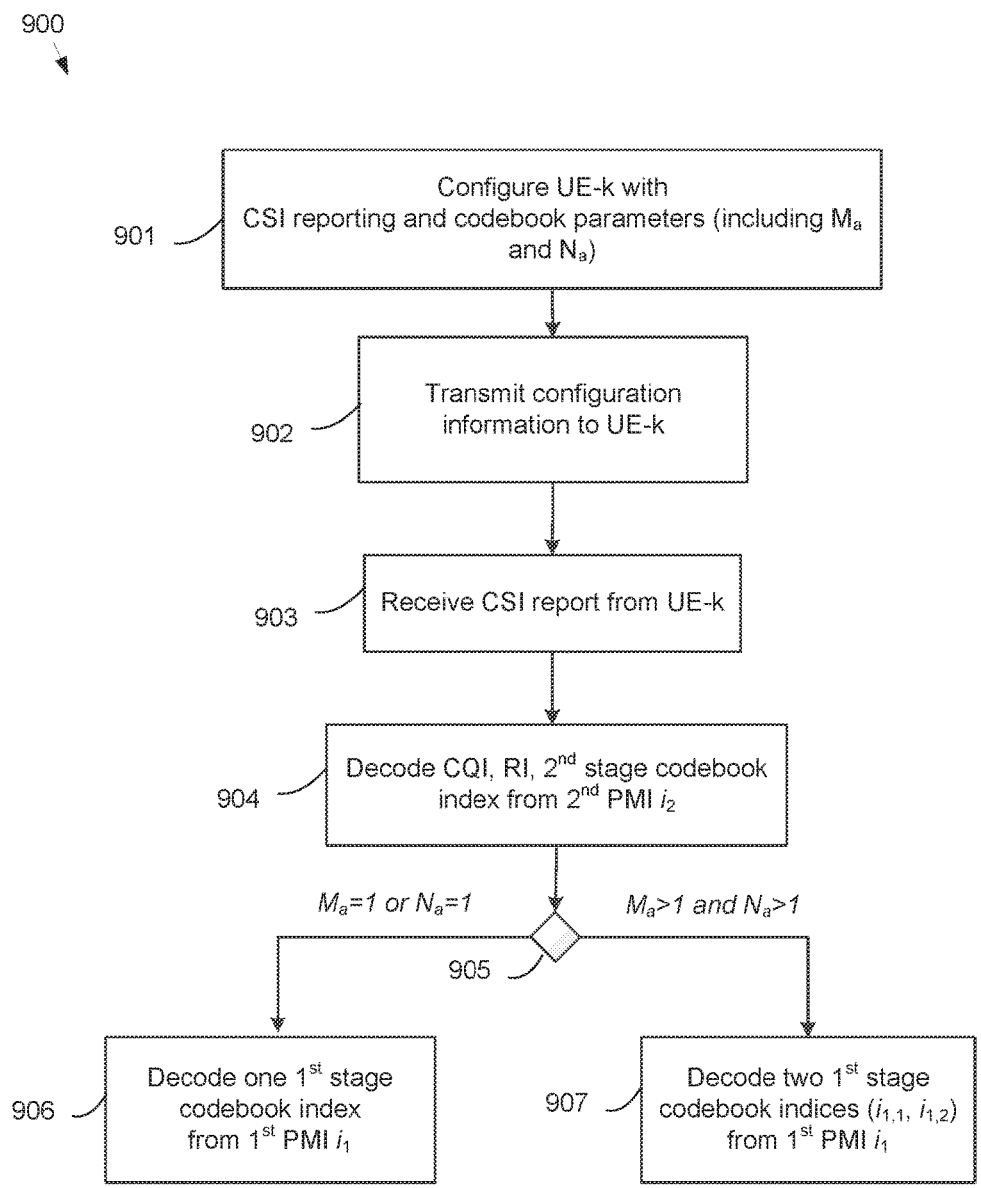
FIG. 9 illustrates an example method wherein an eNB configures a UE with CSI reporting and codebook parameters and in turn receives a CSI report including at least CQI, RI, a first PMI, and a second PMI wherein the number of codebook indices associated with the first PMI is conditioned on at least two codebook parameters.

FIG. 9 illustrates an example method 900 wherein an eNB configures a UE (labeled as UE-k for illustrative purposes) with CSI reporting and codebook parameters (901). The CSI reporting configuration can include a choice of CSI reporting mode. Two of the codebook parameters are $M_a$ and $N_a$ which can correspond to the number of rows and columns in a two-dimensional dual-polarized port array with a total of $2M_a$, $N_a$ ports. The eNB transmits this configuration information to UE-k via a DL channel (902). The eNB also receives a CSI report from UE-k (903), in response to the transmitted configuration information, which includes at least a CQI, a RI, a first PMI, and a second PMI. Upon receiving the CSI report, the eNB decodes the CQI, the RI, and a second-stage codebook index from the second PMI (904). If at least one of $M_a$ and $N_a$ equals to 1 at 905, $i_1$ includes one codebook index associated with a first-stage precoding (906). If each of $M_a$ and $N_a$ equals to a value greater than 1, $i_1$ includes two codebook indices associated with a first-dimension $i_{1,1}$ and a second-dimension $i_{1,2}$ of the first-stage precoding, respectively (907).

The above configuration information is signaled to the UE via higher-layer or RRC signaling. At least one of the codebook parameters can also be signaled to the UE via higher-layer or RRC signaling. In another example, signaling via a DL control channel can be used at least for one of the codebook parameters.

Although FIGS. 8 and 9 illustrate examples of processes for receiving configuration information and configuring a UE, respectively, various changes could be made to FIGS. 8 and 9. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to receive configuration information for a channel state information (CSI) reporting, wherein the configuration information includes a plurality of precoding codebook parameters, the plurality of precoding codebook parameters including a number of antenna ports in a first dimension and a second dimension; and
a processor operably connected to the transceiver, the processor configured to determine, in response to receipt of the configuration information for the CSI reporting including the plurality of precoding codebook parameters, a first precoding matrix indicator (PMI) and a second PMI,
wherein the first PMI includes one codebook index when one of the number of antenna ports in the first dimension and the second dimension equals one,
wherein the first PMI includes two codebook indices when each of the number of antenna ports in the first dimension and the second dimension is greater than one, and
wherein the transceiver is further configured to transmit the CSI reporting on an uplink channel, the CSI reporting including the determined first and second PMIs.

2. The UE of claim 1, wherein:
the two codebook indices of the first PMI are reported with a same frequency granularity and concatenated into a bit sequence.

3. The UE of claim 1, wherein a frequency granularity of a first codebook index of the first PMI is separately configured from that of a second codebook index of the first PMI for aperiodic CSI reporting.

4. The UE of claim 1, wherein the CSI reporting further includes a channel quality indicator (CQI).

5. The UE of claim 4, wherein a frequency granularity of the CQI is separately configured from that of the PMIs for aperiodic CSI reporting using two configuration parameters.

6. The UE of claim 4, wherein time granularity of the CQI is separately configured from that of the PMIs for periodic CSI reporting.

7. The UE of claim 1, wherein a frequency granularity of a first of the one or two codebook indices of the first PMI is separately configured from that of a second of the one or two codebook indices of the first PMI for aperiodic CSI reporting using two configuration parameters.

8. A base station (BS) comprising:
a transceiver; and
a processor operably connected to the transceiver, the processor configured to:
generate a plurality of precoding codebook parameters, the plurality of precoding codebook parameters including a number of antenna ports in a first dimension and a second dimension;
cause the transceiver to transmit, to a user equipment (UE), configuration information for channel state information (CSI) reporting including the plurality of precoding codebook parameters; and
receive a CSI report from the UE generated responsive to the transmitted configuration information transmitted from the BS, the CSI report including codebook indices from first and second precoding matrix indicators (PMIs),
wherein the first PMI includes one codebook index when one of the number of antenna ports in the first dimension and the second dimension equals one, and
wherein the first PMI includes two codebook indices when each of the number of antenna ports in the first dimension and the second dimension is greater than one.

9. The BS of claim 8, wherein:
the codebook indices of the first PMI within the CSI report generated by the UE and received at the BS are reported with a same frequency granularity and concatenated into a bit sequence.

10. The BS of claim 8, wherein a frequency granularity of a first codebook index of the first PMI within the CSI report generated by the UE and received at the BS is separately configured from that of a second codebook index of the first PMI within the CSI report generated by the UE and received at the BS for aperiodic CSI reporting.

11. The BS of claim 8, wherein the CSI reporting further includes a channel quality indicator (CQI).

12. The BS of claim 11, wherein a frequency granularity of the CQI within the CSI report generated by the UE and received at the BS is separately configured from that of the first PMI within the CSI report generated by the UE and received at the BS for aperiodic CSI reporting.

13. The BS of claim 8, wherein a frequency granularity of a first codebook index of the first PMI within the CSI report generated by the UE and received at the BS is separately configured from that of a second codebook index of the first PMI within the CSI report generated by the UE and received at the BS for aperiodic CSI reporting using two configuration parameters.

14. A method for operating a user equipment (UE), the method comprising:
    receiving, by the UE, configuration information for a channel state information (CSI) reporting, wherein the configuration information includes a plurality of precoding codebook parameters, the plurality of precoding codebook parameters including a number of antenna ports in a first dimension and a second dimension; and
    in response to receipt of the configuration information for the CSI reporting including the plurality of precoding codebook parameters, determining, by the UE, a first precoding matrix indicator (PMI) and a second PMI,
    wherein the first PMI includes one codebook index when one of the number of antenna ports in the first dimension and the second dimension equals one,
    wherein the first PMI includes two codebook indices when each of the number of antenna ports in the first dimension and the second dimension is greater than one, and
    transmitting, by the UE, the CSI reporting on an uplink channel, the CSI reporting including the determined first and second PMIs.

15. The method of claim 14, wherein:
    the two codebook indices of the first PMI are reported with a same frequency granularity and concatenated into a bit sequence.

16. The method of claim 14, wherein a frequency granularity of a first codebook index of the first PMI is separately configured from that of a second codebook index of the first PMI for aperiodic CSI reporting.

17. The method of claim 14, wherein the CSI reporting further includes a channel quality indicator (CQI).

18. The method of claim 17, wherein a frequency granularity of the CQI is separately configured from that of the PMIs for aperiodic CSI reporting using two configuration parameters.

19. The method of claim 17, wherein time granularity of the CQI is separately configured from that of the PMIs for periodic CSI reporting.

20. The method of claim 14, wherein a frequency granularity of a first of the one or two codebook indices of the first PMI is separately configured from that of a second of the one or two codebook indices of the first PMI for aperiodic CSI reporting using two configuration parameters.

* * * * *